United States Patent
Ching et al.

(10) Patent No.: US 12,093,103 B2
(45) Date of Patent: *Sep. 17, 2024

(54) WAKE SOURCE COMMUNICATION ACCORDING TO 10SPE LOCAL AND REMOTE WAKE AND RELATED SYSTEMS, METHODS, AND DEVICES

(71) Applicant: Microchip Technology Incorporated, Chandler, AZ (US)

(72) Inventors: Eric Ching, Austin, TX (US); Venkatraman Iyer, Austin, TX (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/058,650

(22) Filed: Nov. 23, 2022

(65) Prior Publication Data

US 2023/0091738 A1 Mar. 23, 2023

Related U.S. Application Data

(63) Continuation of application No. 17/301,094, filed on Mar. 24, 2021, now Pat. No. 11,513,577.

(Continued)

(51) Int. Cl.
*G06F 1/00* (2006.01)
*G06F 1/3203* (2019.01)
(Continued)

(52) U.S. Cl.
CPC .......... *G06F 1/3203* (2013.01); *G06F 9/4418* (2013.01); *G06F 13/20* (2013.01); *G06F 1/3209* (2013.01); *G06F 1/3215* (2013.01)

(58) Field of Classification Search
CPC ....... G06F 1/3203; G06F 9/4418; G06F 13/20
(Continued)

(56) References Cited

U.S. PATENT DOCUMENTS

| 4,596,011 A | 6/1986 | Kobayashi et al. |
| 4,739,276 A | 4/1988 | Graube |

(Continued)

FOREIGN PATENT DOCUMENTS

| CA | 944431 A | 3/1974 |
| CN | 1426650 A | 6/2003 |

(Continued)

OTHER PUBLICATIONS

Fitzgerald: "10BASE-T1L Low Power Idle (802.3cg D2.0)", IEEE-Sa, Acuitas Silicon, (Aug. 15, 2018) 9 pages.

(Continued)

*Primary Examiner* — Volvick Derose
(74) *Attorney, Agent, or Firm* — TraskBritt

(57) ABSTRACT

One or more examples relate, generally, to an apparatus. Such an apparatus includes a digital interface, a wake detect logic, and a power management connection. The digital interface may define a physical layer transceiver side of a connection between a physical layer transceiver and a physical layer controller, respectively of a 10SPE physical layer. The wake detect logic may communicate a source of detected wake from the physical layer transceiver to the physical layer controller via the digital interface. The power management connection may operatively couple to an enable connection of a switched voltage regulator.

26 Claims, 15 Drawing Sheets

Related U.S. Application Data

(60) Provisional application No. 62/993,825, filed on Mar. 24, 2020.

(51) Int. Cl.
    *G06F 9/4401*     (2018.01)
    *G06F 13/20*     (2006.01)
    *G06F 1/3209*     (2019.01)
    *G06F 1/3215*     (2019.01)

(58) Field of Classification Search
    USPC ........................................................ 713/323
    See application file for complete search history.

(56) References Cited

U.S. PATENT DOCUMENTS

| | | | |
|---|---|---|---|
| 4,970,466 A | 11/1990 | Bolles et al. | |
| 5,134,377 A | 7/1992 | Reddy et al. | |
| 5,305,459 A | 4/1994 | Rydel | |
| 5,357,145 A | 10/1994 | Segaram | |
| 5,381,348 A | 1/1995 | Ernst et al. | |
| 5,581,556 A * | 12/1996 | Ohie | H04L 12/12 375/220 |
| 5,784,573 A | 7/1998 | Szczepanek et al. | |
| 5,859,554 A | 1/1999 | Higashisaka et al. | |
| 5,892,893 A | 4/1999 | Hanf et al. | |
| 6,029,202 A | 2/2000 | Frazier et al. | |
| 6,067,408 A | 5/2000 | Runaldue et al. | |
| 6,115,831 A * | 9/2000 | Hanf | H04L 69/40 714/43 |
| 6,185,195 B1 | 2/2001 | Leung | |
| 6,215,816 B1 | 4/2001 | Gillespie et al. | |
| 6,459,739 B1 | 10/2002 | Vitenberg | |
| 6,463,543 B1 | 10/2002 | Alvarez | |
| 6,479,983 B1 | 11/2002 | Ebiya | |
| 6,633,577 B1 | 10/2003 | Nyu | |
| 6,691,241 B1 | 2/2004 | Taylor | |
| 6,735,217 B1 | 5/2004 | Webber et al. | |
| 6,920,132 B1 | 7/2005 | Lo | |
| 6,973,094 B1 | 12/2005 | Holloway et al. | |
| 7,110,423 B1 | 9/2006 | Sethuram et al. | |
| 7,319,705 B1 | 1/2008 | Wu et al. | |
| 7,420,986 B1 | 9/2008 | Howard et al. | |
| 7,558,348 B1 | 7/2009 | Liu et al. | |
| 7,808,247 B1 | 10/2010 | Lo | |
| 7,906,973 B1 | 3/2011 | Orr | |
| 8,243,752 B2 | 8/2012 | Barkan et al. | |
| 8,935,125 B1 | 1/2015 | Fu et al. | |
| 9,454,212 B1 | 9/2016 | Schulze | |
| 9,628,082 B1 | 4/2017 | Smith et al. | |
| 9,696,361 B1 | 7/2017 | Sun et al. | |
| 10,102,693 B1 | 10/2018 | Wu | |
| 10,684,977 B1 | 6/2020 | Seger et al. | |
| 10,863,386 B1 | 12/2020 | Anand et al. | |
| 11,121,782 B2 | 9/2021 | Zang et al. | |
| 11,197,322 B2 * | 12/2021 | Iyer | H04W 74/0816 |
| 11,218,964 B2 * | 1/2022 | Chae | H04W 76/28 |
| 2002/0150107 A1 | 10/2002 | Aronson et al. | |
| 2002/0162038 A1 * | 10/2002 | Bullman | H04L 12/12 713/323 |
| 2003/0061341 A1 | 3/2003 | Loh et al. | |
| 2003/0126486 A1 * | 7/2003 | Bui | H04L 12/12 713/320 |
| 2003/0200306 A1 | 10/2003 | Park et al. | |
| 2003/0225802 A1 | 12/2003 | Ruthstein et al. | |
| 2003/0226050 A1 | 12/2003 | Yik et al. | |
| 2004/0028164 A1 | 2/2004 | Jiang et al. | |
| 2004/0047367 A1 | 3/2004 | Mammen | |
| 2004/0145500 A1 * | 7/2004 | Huebl | H04L 12/40039 340/994 |
| 2004/0240598 A1 | 12/2004 | Yin | |
| 2004/0251912 A1 | 12/2004 | Pharn et al. | |
| 2005/0058452 A1 | 3/2005 | Kramer et al. | |
| 2005/0063116 A1 | 3/2005 | Rotheroe | |
| 2005/0078683 A1 | 4/2005 | Page | |
| 2005/0128826 A1 | 6/2005 | Kwack et al. | |
| 2006/0007991 A1 | 1/2006 | Wang et al. | |
| 2006/0109784 A1 | 5/2006 | Weller et al. | |
| 2006/0181283 A1 | 8/2006 | Wajcer et al. | |
| 2006/0209710 A1 | 9/2006 | Watanabe | |
| 2006/0222129 A1 | 10/2006 | Hadzic et al. | |
| 2007/0008011 A1 | 1/2007 | Thurston | |
| 2007/0069768 A1 | 3/2007 | Hatooka et al. | |
| 2007/0121624 A1 | 5/2007 | Kimbrough et al. | |
| 2007/0133586 A1 | 6/2007 | Ojard et al. | |
| 2007/0160087 A1 | 7/2007 | Findlater et al. | |
| 2008/0024178 A1 | 1/2008 | Kim et al. | |
| 2008/0037693 A1 | 2/2008 | Andrus et al. | |
| 2008/0117810 A1 | 5/2008 | Stott et al. | |
| 2008/0159330 A1 | 7/2008 | Deng et al. | |
| 2008/0162682 A1 * | 7/2008 | Ramachandran | H04W 52/0229 709/223 |
| 2008/0186996 A1 | 8/2008 | Powell et al. | |
| 2009/0003835 A1 | 1/2009 | Arahira | |
| 2009/0201936 A1 | 8/2009 | Dumet et al. | |
| 2010/0164505 A1 | 7/2010 | Breed et al. | |
| 2010/0202436 A1 | 8/2010 | Albert et al. | |
| 2010/0246693 A1 | 9/2010 | Ushio et al. | |
| 2010/0322105 A1 | 12/2010 | Diab | |
| 2011/0022699 A1 * | 1/2011 | Powell | H04L 12/40039 709/224 |
| 2011/0028104 A1 | 2/2011 | Giombanco et al. | |
| 2011/0051601 A1 | 3/2011 | Linsky et al. | |
| 2011/0170476 A1 | 7/2011 | Shapira et al. | |
| 2012/0087662 A1 | 4/2012 | Suzuki et al. | |
| 2012/0155476 A1 | 6/2012 | Pavani et al. | |
| 2012/0229214 A1 | 9/2012 | Kasanyal | |
| 2012/0300710 A1 * | 11/2012 | Li | H04W 88/085 370/329 |
| 2012/0307637 A1 | 12/2012 | Diab | |
| 2013/0007480 A1 * | 1/2013 | Wertheimer | G06F 1/3203 713/310 |
| 2013/0021063 A1 | 1/2013 | Kwon | |
| 2013/0101058 A1 | 4/2013 | Hummel | |
| 2013/0159489 A1 * | 6/2013 | Cha | H04L 65/1069 709/223 |
| 2013/0162300 A1 | 6/2013 | Liu et al. | |
| 2013/0229926 A1 | 9/2013 | Lu et al. | |
| 2013/0329773 A1 | 12/2013 | Cheng et al. | |
| 2014/0073352 A1 | 3/2014 | Aldana et al. | |
| 2014/0133496 A1 | 5/2014 | Sugiura et al. | |
| 2014/0177653 A1 | 6/2014 | Tzeng | |
| 2014/0268141 A1 | 9/2014 | Pariseau | |
| 2014/0269758 A1 | 9/2014 | Sutterlin et al. | |
| 2014/0281626 A1 | 9/2014 | Younger et al. | |
| 2015/0063375 A1 | 3/2015 | Tzeng et al. | |
| 2015/0124797 A1 | 5/2015 | Babitch et al. | |
| 2015/0131708 A1 | 5/2015 | Cornett et al. | |
| 2015/0145563 A1 | 5/2015 | Pardoen | |
| 2015/0145581 A1 | 5/2015 | Palmer et al. | |
| 2015/0205339 A1 * | 7/2015 | Park | G06F 1/3278 713/323 |
| 2015/0237178 A1 | 8/2015 | Zhang | |
| 2015/0370312 A1 * | 12/2015 | Desposito | G06F 13/4247 713/323 |
| 2016/0094362 A1 | 3/2016 | Brennan | |
| 2016/0156458 A1 | 6/2016 | Babitch et al. | |
| 2016/0323287 A1 | 11/2016 | Kishikawa et al. | |
| 2016/0337138 A1 * | 11/2016 | Gardner | H04L 12/403 |
| 2017/0046298 A1 | 2/2017 | Yu et al. | |
| 2017/0048887 A1 | 2/2017 | Feng | |
| 2017/0111069 A1 | 4/2017 | Dafesh et al. | |
| 2017/0134152 A1 | 5/2017 | Yamamoto et al. | |
| 2017/0187479 A1 | 6/2017 | Yamamoto et al. | |
| 2017/0214513 A1 | 7/2017 | Asada et al. | |
| 2017/0222685 A1 * | 8/2017 | Khan | H04B 17/318 |
| 2017/0257273 A1 | 9/2017 | Li et al. | |
| 2017/0308946 A1 | 10/2017 | Bursey | |
| 2017/0310541 A1 | 10/2017 | Jin | |
| 2017/0346620 A1 | 11/2017 | Bucci et al. | |
| 2018/0034658 A1 | 2/2018 | Kinage et al. | |

(56) References Cited

U.S. PATENT DOCUMENTS

| | | | |
|---|---|---|---|
| 2018/0062821 A1 | 3/2018 | Mamidwar et al. | |
| 2018/0091251 A1 | 3/2018 | Hanneman, Jr. | |
| 2018/0165056 A1 | 6/2018 | Lay et al. | |
| 2018/0181525 A1 | 6/2018 | Iyer et al. | |
| 2018/0220161 A1 | 8/2018 | Schierl et al. | |
| 2018/0227015 A1* | 8/2018 | McCormack | H04W 76/10 |
| 2018/0262526 A1 | 9/2018 | Jain et al. | |
| 2018/0314285 A1 | 11/2018 | Susanto et al. | |
| 2018/0331776 A1 | 11/2018 | Wang et al. | |
| 2019/0133512 A1 | 5/2019 | Elia et al. | |
| 2019/0179398 A1* | 6/2019 | Arora | G06F 1/26 |
| 2019/0199537 A1* | 6/2019 | Seo | H04L 12/12 |
| 2019/0230705 A1 | 7/2019 | Beruto et al. | |
| 2019/0261420 A1 | 8/2019 | Pannell et al. | |
| 2019/0268941 A1 | 8/2019 | Axer et al. | |
| 2019/0313446 A1 | 10/2019 | Kim et al. | |
| 2019/0357146 A1* | 11/2019 | Kim | H04W 52/0274 |
| 2019/0361711 A1* | 11/2019 | Kim | H04L 69/323 |
| 2019/0363991 A1 | 11/2019 | Sostawa et al. | |
| 2019/0385057 A1 | 12/2019 | Litichever et al. | |
| 2020/0067727 A1* | 2/2020 | Pannell | H04L 47/34 |
| 2020/0136993 A1 | 4/2020 | Yun et al. | |
| 2020/0145263 A1 | 5/2020 | Gotz | |
| 2020/0153174 A1* | 5/2020 | Curtis | H01R 13/6272 |
| 2020/0295957 A1* | 9/2020 | Kim | H04L 67/145 |
| 2020/0343993 A1 | 10/2020 | Rentschler et al. | |
| 2020/0351943 A1 | 11/2020 | Iyer et al. | |
| 2020/0367096 A1 | 11/2020 | Hwang et al. | |
| 2020/0371579 A1 | 11/2020 | Selvam et al. | |
| 2021/0055963 A1* | 2/2021 | An | H04L 12/10 |
| 2021/0056060 A1 | 2/2021 | An et al. | |
| 2021/0058168 A1 | 2/2021 | Zang et al. | |
| 2021/0058177 A1 | 2/2021 | Iyer et al. | |
| 2021/0058224 A1 | 2/2021 | Iyer et al. | |
| 2021/0058269 A1 | 2/2021 | Zang et al. | |
| 2021/0058498 A1 | 2/2021 | Iyer et al. | |
| 2021/0058965 A1 | 2/2021 | Chen et al. | |
| 2021/0067907 A1 | 3/2021 | Sze et al. | |
| 2021/0282087 A1* | 9/2021 | den Besten | H04B 1/401 |
| 2022/0046114 A1 | 2/2022 | Entelis et al. | |

FOREIGN PATENT DOCUMENTS

| | | |
|---|---|---|
| CN | 1547860 A | 11/2004 |
| CN | 101127928 A | 2/2008 |
| CN | 101566665 A | 10/2009 |
| CN | 101616048 A | 12/2009 |
| CN | 102017778 A | 4/2011 |
| CN | 1866803 B | 5/2012 |
| CN | 102813530 A | 12/2012 |
| CN | 102891702 A | 1/2013 |
| CN | 204392278 U | 6/2015 |
| CN | 105681148 A | 6/2016 |
| CN | 106031098 A | 10/2016 |
| CN | 106603310 A | 4/2017 |
| CN | 107836131 A | 3/2018 |
| CN | 108173703 A | 6/2018 |
| CN | 108781091 A | 11/2018 |
| DE | 102018105007 A1 | 9/2019 |
| DE | 112019002669 T5 | 3/2021 |
| DE | 112020002093 T5 | 1/2022 |
| EP | 0620664 | 10/1994 |
| EP | 1388975 A1 | 2/2004 |
| EP | 1940086 A1 | 7/2008 |
| EP | 2779535 A1 | 9/2014 |
| EP | 2816501 A1 | 12/2014 |
| EP | 3094044 A1 | 11/2016 |
| EP | 3573287 A1 | 11/2019 |
| EP | 3618364 A1 | 3/2020 |
| GB | 1351654 A | 5/1974 |
| JP | 58-131848 A | 8/1983 |
| JP | 59-158148 A | 9/1984 |
| JP | S63-304727 A | 12/1988 |
| JP | 01-260949 A | 10/1989 |
| JP | H03-006944 A | 1/1991 |
| JP | 04-072937 A | 3/1992 |
| JP | 2002-507365 A | 3/2002 |
| JP | 2003-125024 A | 4/2003 |
| JP | 2003-318911 A | 11/2003 |
| JP | 2004-517558 A | 6/2004 |
| JP | 2005-136979 A | 5/2005 |
| JP | 2007-521758 A | 8/2007 |
| JP | 2008-039532 A | 2/2008 |
| JP | 2009-219021 A | 9/2009 |
| JP | 2010-226406 A | 10/2010 |
| JP | 2011-052936 A | 3/2011 |
| JP | 2011-193039 A | 9/2011 |
| JP | 2013-024614 A | 2/2013 |
| JP | 2013-200687 A | 10/2013 |
| JP | 2015-126303 A | 7/2015 |
| JP | 2018-042019 A | 3/2018 |
| NL | 7113537 A | 4/1972 |
| RU | 2020570 C1 | 9/1994 |
| WO | 1994/016303 A1 | 7/1994 |
| WO | 2018/136116 A1 | 7/2018 |

OTHER PUBLICATIONS

International Search Report from International Application No. PCT/US2021/070305, mailed Aug. 5, 2021, 7 pages.

International Written Opinion from International Application No. PCT/US2021/070305, mailed Aug. 5, 2021, 12 pages.

Invitation to Pay Additional Fees from International Application No. PCT/US2021/070305, mailed Jun. 15, 2021, 15 pages.

LAN/MAN Standards Committee of the IEEE Computer Society, "Draft Standard for Ethernet Amendment: Physical Layer Specifications and Management Parameters for 10 Mb/s Operation and Associated Power Delivery over a Single Balanced Pair of Conductors," IEEE Draft, P802.3cg/D2.4, Feb. 21, 2019, The Institute of Electrical and Electronics Engineers, Inc., pp. 1-60, New York.

Meier, "Analysis of Worst Case Latencies in an 10 Mbit Ethernet network with PLCA", IEEE Draft, V4, Jan. 17, 2018, pp. 1-11.

Microchip KSZ8061MNX/MNG, "100BASE-T/100BASE-TX Physical Layer Transceiver" Device Document 00002038D (Aug. 15, 2018) 66 pages.

Microsoft. "P." Microsoft Computer Dictionary, 5th ed., Penguin Books, 2002. (Year: 2002).

Pannell et al., "Quality of Service for PLCA", NXP, May 2018 (May 24, 2018), pp. 1-37, vol. 802.1, No. v02 24, Pittsburg.

U.S. Appl. No. 16/843,648, filed Apr. 8, 2020, titled "Emulating Collisions in Wired Local Area Networks and Related Systems, Methods, and Devices", to Iyer et al., 53 pages.

U.S. Appl. No. 62/881,720, filed Aug. 1, 2019, titled "Single Pair Ethernet Physical Layer Architecture and Systems, Devices, and Me I Hods for Implementing the Same", to Iyer et al., 35 pages.

U.S. Appl. No. 62/993,825, filed Mar. 24, 2020, titled "Low Pin Count Handshake Signaling Protocol According to 10BASE-T1X Local and Remote Wake De I Ect and Related Systems, Me I Hods, and Devices", to Iyer et al., 13 pages.

Beruto, Piergiorgio et al., 802.3cg draft 2.0 PLCA (Clause 148) Overview, IEEE 802,3 Plenary Meeting, Jul. 9, 2018, 23 pages.

Chinese First Office Action and Search Report for Chinese Patent Application Serial No. 201910784058.2, issued Nov. 7, 2023, 40 pages with English translation.

Chinese First Office Action for Chinese Application No. 201910784565.6, dated Sep. 8, 2023, 27 pages with English translation.

Chinese First Office Action for Chinese Application No. 201910785140.7, dated May 31, 2023, 17 pages with English translation.

Chinese First Office Action for Chinese Application No. 202210842861.9, dated Aug. 30, 2023, 15 pages with English translation.

Chinese Second Office Action for Chinese Application No. 201910785140.7, dated Oct. 25, 2023, 10 pages with English translation.

Korean Notice of Provisional Rejection for Korean Application No. 10-2022-7009593, dated Jul. 4, 2023, 17 pages with English translation.

Korean Request for the Submission of an Opinion for Korean Patent Application No. 10-2022-7005572, mailed Jan. 26, 2024, 21 pages with English translation.

(56) References Cited

OTHER PUBLICATIONS

Notice of Reasons for Refusal for Japanese Patent Application No. 2022-510900, issued Sep. 5, 2023, 10 pages with English translation.
Request for the Submission of an Opinion of Korean Application No. 10-2021-7037128, issued Feb. 16, 2024, 10 pages with English translation.
Request for the Submission of an Opinion of Korean Patent Application No. 10-2022-7007012, issued Feb. 23, 2024, 12 pages with English translation.
The Second Office Action of Chinese Patent Application No. 202210842861.9, issued Feb. 9, 2024, 15 pages with English translation.
Draft Standard for Ethernet Amendment 4: Physical Layer Specifications and Management Parameters for 10Mb/s Operation and Associated Power Delivery over a Single Balanced Pair of Conductors, LAN/MAN Standards Committee of the IEEE Computer Society, IEEE P802.3cg, Jul. 18, 2019, pp. 1-3, 234, 235.
IEEE Draft Standard for Ethernet—Amendment 4: Physical Layer Specifications and Management Parameters for 10 Mb/s Operation and Associated Power Delivery over a Single Balanced Pair of Conductors, LAN/MAN Standards Committee of IEEE Computer Society, Jul. 18, 2019, 5 pages.
Japanese Notice of Reasons for Refusal of Japanese Patent Application No. 2022-557156, mailed Apr. 16, 2024, 4 pages with English translation.
Notice of Reasons for Refusal of Japanese Patent Application No. 2021-565015, issued Apr. 30, 2024, 5 pages with English translation.
Notice of Reasons for Refusal of Japanese Patent Application No. 2022-510903, mailed Jun. 18, 2024, 12 pages with English translation.
Notice of Reasons for Refusal of Japanese Patent Application No. 2022-510905, issued Jul. 2, 2024, 12 pages with English translation.
Notice of Reasons for Refusal of Japanese Patent Application No. 2022-510907, issued Jul. 2, 2024, 12 pages with English translation.
Notification to Grant Patent Right for Invention and Search Report of Chinese Patent Application No. 201910784058.2, issued May 1, 2024, 11 pages with English translation.
Qiming et al., Power cable partial discharge fault location based on high-speed sampling device, Electronic Technology Applications, vol. 41, Issue 8, 2015, pp. 70-75, 8 total pages with English translation.
Second Office Action of Chinese Patent Application No. 201910784565.6, issued Jun. 8, 2024, 24 pages with English translation.
Notice of Reasons for Refusal of Japanese Patent Application No. 2022-510899, mailed Jul. 30, 2024, 8 pages with English translation.
Notice of Reasons for Refusal of Japanese Patent Application No. 2022-510909, issued Jul. 16, 2024, 8 pages with English translation.
Request for the Submission of an Opinion of Korean Patent Application No. 10-2022-7009587, issued Jun. 20, 2024, 21 pages with English translation.

\* cited by examiner

WAKE SOURCE COMMUNICATION ACCORDING TO 10SPE LOCAL AND REMOTE WAKE AND RELATED SYSTEMS, METHODS, AND DEVICES

CROSS-REFERENCE TO RELATED APPLICATIONS

This application is a continuation of U.S. patent application Ser. No. 17/301,094, filed Mar. 24, 2021, now U.S. Pat. No. 11,506,141, issued Nov. 22, 2022, which claims the benefit under 35 U.S.C. § 119(e) of U.S. Provisional Patent Application Ser. No. 62/993,825, filed Mar. 24, 2020, the disclosure of each of which is hereby incorporated herein in its entirety by this reference.

TECHNICAL FIELD

This disclosure relates, generally, to single pair Ethernet networks. Some embodiments relate to a low connection interface for a 10SPE physical layer module have a split arrangement. Some embodiments relate to communicating a source of a 10SPE wake. Some embodiments relate to a physical layer transceiver package that includes pin assignments for a low connection interface. Some embodiments relate to checking the integrity of digital logic circuitry of a digital interface of a physical layer controller of a 10SPE physical layer module having a split arrangement, and related systems, methods and devices.

BACKGROUND

Interconnects are widely used to facilitate communication among devices of a network, sub-systems and systems. Generally speaking, electrical signals are transmitted on a physical medium (e.g., a bus, a coaxial cable, or a twisted pair, without limitation—generically referred to simply as a "line" or a "bus") by the devices coupled to the physical medium.

According to the Open Systems Interconnection model (OSI model), Ethernet-based computer networking technologies use baseband transmission (i.e., electrical signals are discrete electrical pulses) to transmit data packets and ultimately messages that are communicated among network devices. According to the OSI model, specialized circuitry called a physical layer (PHY) device or controller is used to interface between an analog domain of a line and a digital domain of a data link layer (also referred to herein simply as a "link layer") that operates according to packet signaling. While the data link layer may include one or more sublayers, in Ethernet-based computer networking, a data link layer typically includes at least a media access control (MAC) layer that provides control abstraction of the physical layer. By way of non-limiting example, when transmitting data to another device on a network, a MAC controller may prepare frames for the physical medium, add error correction elements, and implement collision avoidance. Further, when receiving data from another device, a MAC controller may ensure integrity of received data and prepare frames for higher layers.

There are various network topologies that implement physical layers and link layers (and may include other layers, without limitation). The Peripheral Component Interconnect (PCI) standard and the Parallel Advanced Technology Attachment (Parallel ATA) standard, both in use since the early 1990's, may implement a multidrop bus topology. The trend since the early 2000's has been to use point-to-point bus topologies, for example, the PCI Express standard (PCIe) and the Serial ATA (SATA) standard implement point-to-point topologies.

A typical point-to-point bus topology may implement lines between each device (e.g., dedicated point-to-point, without limitation) or lines between devices and switches (e.g., switched point-to-point, without limitation). In a multidrop bus topology, a physical transmission medium is a shared bus and each network device is coupled to the shared bus, for example, via a circuit chosen based on the type of physical medium (e.g., coaxial or twisted pair, without limitation).

Point-to-point bus topologies, such as a dedicated point-to-point topology or a switched point-to-point topology, require more wires and more expensive material than multidrop topologies due, in part, to the greater number of links between devices. In certain applications, such as automotive, there may be physical constraints that make it difficult to directly connect devices, and so a topology that does not require, or does not require as many, direct connections (e.g., a multidrop topology, without limitation) in a network or a sub-network may be less susceptible to, or hampered by, such constraints.

Devices that are on a baseband network (e.g., a multidrop network without limitation) share the same physical transmission medium, and typically use the entire bandwidth of that medium for transmission (stated another way, a digital signal used in baseband transmission occupies the entire bandwidth of the media). As a result, only one device on a baseband network may transmit at a given instant. So, media access control methods are sometimes used to handle contention for such a shared transmission medium.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
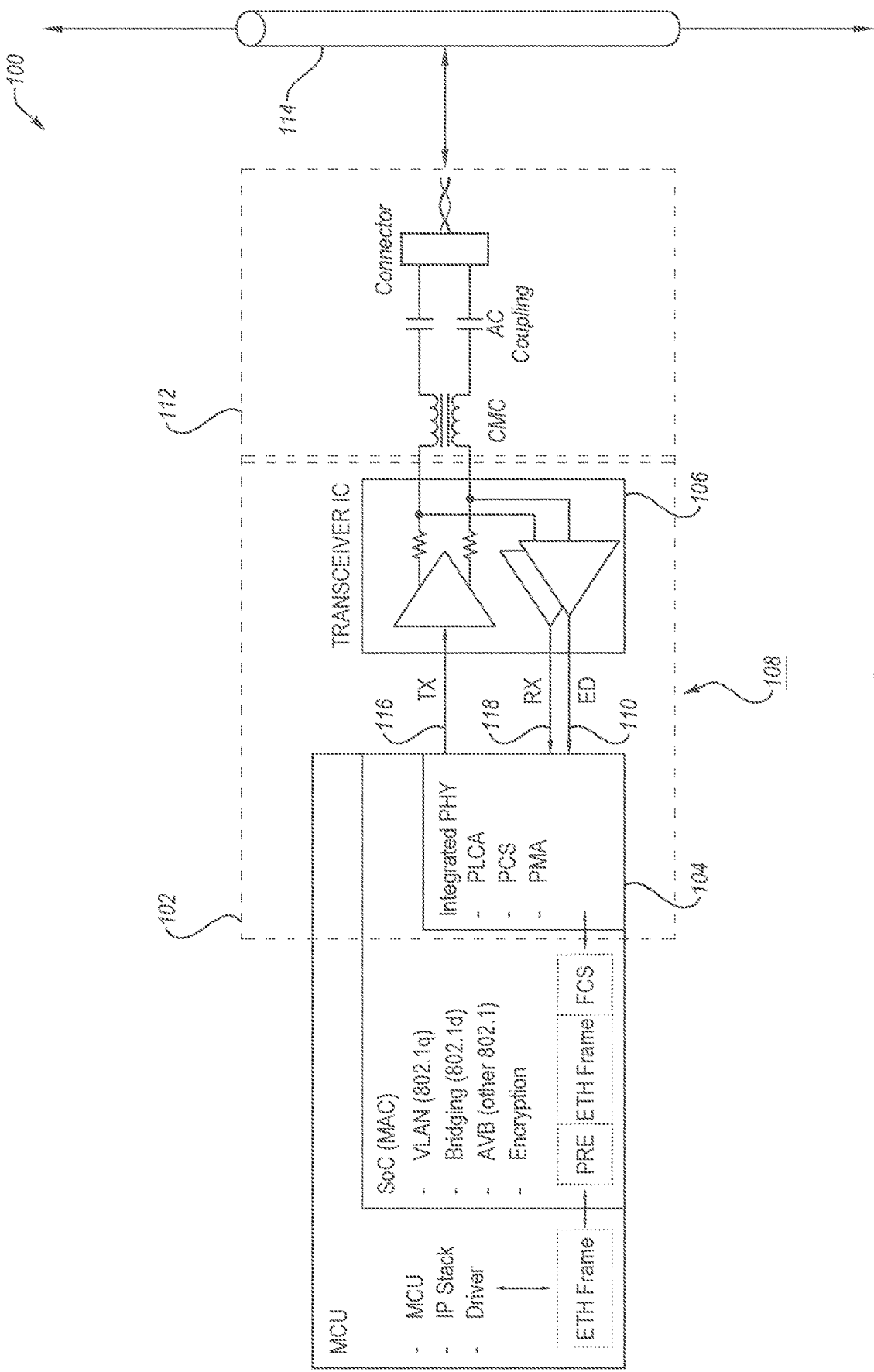
FIG. 1 is a block diagram depicting a physical layer module having a split-PHY architecture in accordance with the state of the art.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner.

In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, the terms "assert," "de-assert" and derivatives thereof used in reference to a pin, means, respectively, to assert or de-assert a signal associated with the pin (e.g., a signal specifically assigned to the pin or a signal to which the pin is specifically assigned, without limitation).

A vehicle, such as an automobile, a truck, a bus, a ship, and/or an aircraft, may include a vehicle communication network. The complexity of the vehicle communication network may vary depending on a number of electronic devices within the network. For example, an advanced vehicle communication network may include various control modules for, as non-limiting examples, engine control, transmission control, safety control (e.g., antilock braking), and emissions control. To support these modules, the automotive industry relies on various communication protocols.

10SPE (i.e., 10 Mbps Single Pair Ethernet) is a network technology currently under specification of IEEE 802.3cg™. 10SPE may be used to provide a collision free, deterministic transmission on a multi-drop network.

A PHY may be designed and/or manufactured in a high voltage temperature process, however, such processes may not be suitable (e.g., could damage or testing may be too expensive, without limitation) for, as non-limiting examples: PHY designs that have large and/or fast digital blocks, random access memory (RAM), and/or one time programmable (OTP) memory, without limitation. A non-limiting example of a high voltage temperature processes is bulk current injection (BCI) susceptibility testing. During BCI and other high voltage temperature processes known to the inventors of this disclosure, junction temperatures of about 175 degrees Celsius may be realized.

One option for addressing some of these concerns is to simplify a digital design for high voltage temperature processes to meet timing requirements or to fit on a die, but a design may not be amenable to simplification or meeting such timing or die space requirements. Size of a die or package may be increased, however, size of die and size of package are typically directly proportional to overall processing cost—the larger the die or package the higher the processing cost.

The 10BASE-T1S Transceiver Interface standard currently under specification development by Technology Committee 14 of the OPEN Alliance (hereinafter the "TC14 Standard") defines a 3-pin hardware interface for a split (controller-transceiver) 10SPE PHY (split-PHY). FIG. 1 is a block diagram depicting a system 100 that includes a split-PHY 102 coupled to a transmission medium 114 by a bus network interface 112. The split-PHY 102 includes the defined 3-pin hardware interface (hardware interface 108) specified by the TC14 Standard as it presently stands. Generally speaking, a first portion of the split-PHY (PHY controller 104) includes digital blocks susceptible to damage during high voltage temperature processes and that may be located on a first die that does not undergo high voltage temperature processes. A second portion of the split-PHY (PHY transceiver 106) including analog and digital blocks less susceptible (individually or as a whole) to high voltage temperature processes may be located on a second die that can undergo high voltage temperature processes.

Hardware interface 108 includes three connections for signaling between PHY transceiver 106 and PHY controller 104: TX connection 116, RX connection 118, and ED connection 110. The 3 connections are typically implemented through respective pins attached to the respective integrated circuits of the split-PHY, and thus each of the 3 connections is associated with respective pins of PHY transceiver 106 and PHY controller 104. The TC14 Standard, as it presently stands, specifies uses for these connections some of which are associated with specific states of the PHY transceiver. In a normal state, TX connection 116 is used for conveying transmit frames from PHY controller 104 to PHY transceiver 106, RX connection 118 is used for conveying received frames from PHY transceiver 106 to PHY controller 104, and ED connection 110 is used for identifying valid signals from PHY transceiver 106 to PHY controller 104. The TC14 standard, as it presently stands, specifies that RX connection 118 is a comparator output of a transceiver that indicates a signal is above or below a threshold, ED connection 110 is a signal detector output of a transceiver that indicates inside or outside a threshold (i.e., indicates in-band and out-band signals), and TX is a clockless, stateful input of the transceiver.

Figure 2:
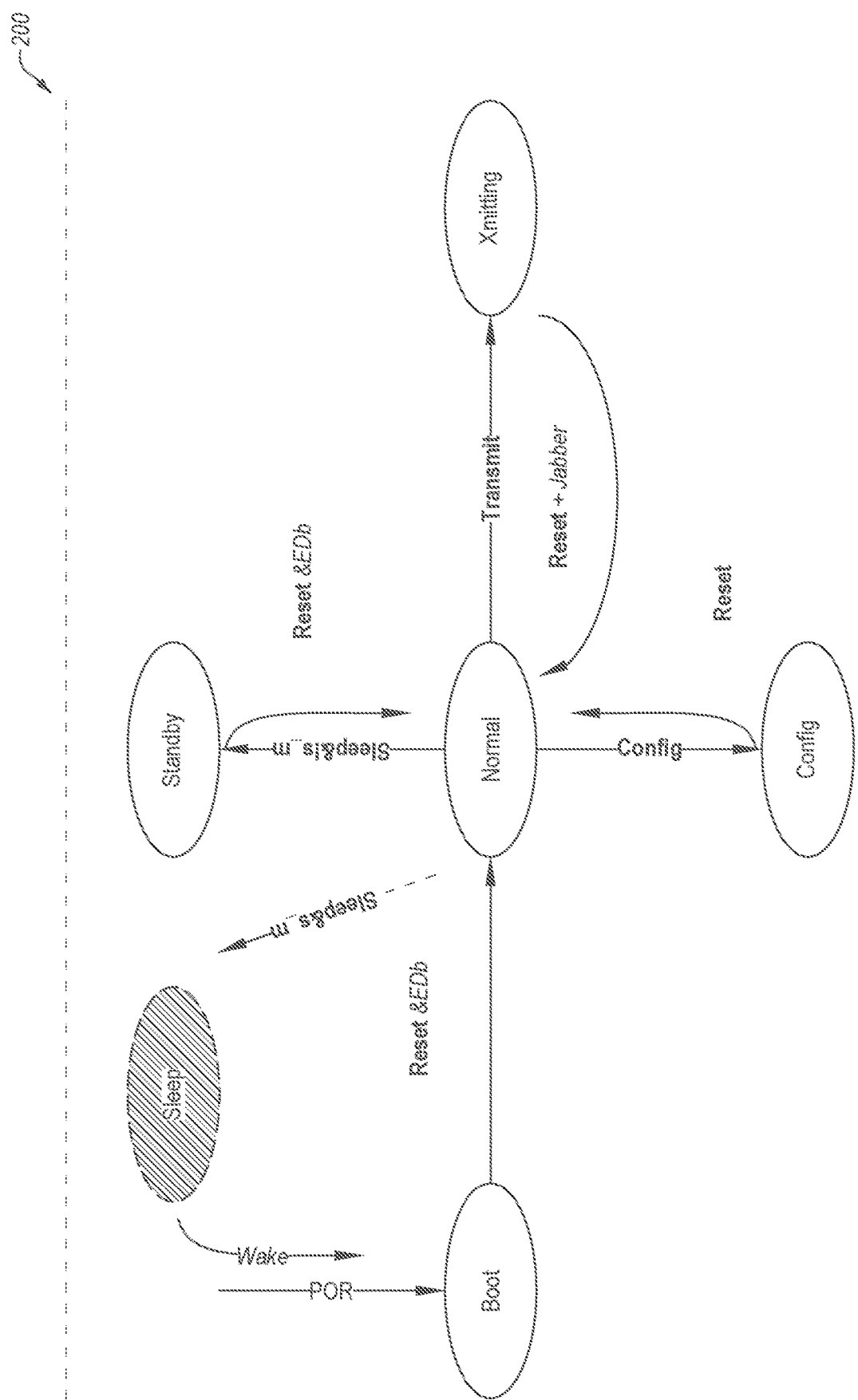
FIG. 2 is state diagram depicting behavior of the split-PHY of FIG. 1 that includes a sleep state, in accordance with one or more embodiments.

A split-PHY may enable more efficient power consumption. Some portions of a split-PHY may enter a low-power or "sleep" mode to conserve power consumption by the split-PHY while other portions of the split-PHY (e.g., a transceiver or other hardware attachment elements, without limitation) supplied by an uninterrupted power supply may perform at least some functions of the split-PHY while the split-PHY as a whole is in a low-power mode. FIG. 2 is a state diagram depicting a specific example of a system behavior 200 for a PHY transceiver of a split-PHY according to the TC14 standard, as it presently stands, (i.e., standby, boot, normal, config and xmitting) and a new state "sleep."

In some cases, it may be desirable to locate specific functions or operations at the portion of a split-PHY that is in the uninterrupted power domain so that they can operate to some extent while in a low power mode. As non-limiting examples, these may be the functions that are associated with low power or wake detection for the split-PHY, a node, a network segment, or a network, or functions associated with fault detection on a physical transmission medium ("cable fault detection").

As mentioned above, in a typical split-PHY, first and second portions of the split-PHY are coupled by a hardware interface of 3 wired connections. Such first and second portions of the split-PHY may each include interface logic configured to associate individual pins with specific signals of the hardware interface, and handle communication and signal propagation over the connections of the hardware interface. In theory any suitable number of pins and connections could be used to implement a hardware interface of a split-PHY.

In practice, a first package including a first portion of the PHY and a second package including a second portion of the PHY each have a limited number of available pins for such a hardware interface. The more pins dedicated to a hardware interface of a PHY, the fewer pins available for other uses without transitioning to a package with more pins. As a non-limiting example, the TC14 standard, as it currently stands, defines a 3-pin hardware interface for split-PHY architectures. Moreover, designers may take into account communication over such a hardware interface when choosing where to locate digital blocks for implementing features and functions of a split-PHY architecture.

Notwithstanding the foregoing or other implementation challenges, a split-PHY architecture may enable a split-PHY (and systems and devices incorporating the same such as network switches, bridges, and end points, without limitation) to be more digitally intensive and more power efficient than some unitary PHY architectures, and so enable designers to take into account these aspects.

Figure 3:
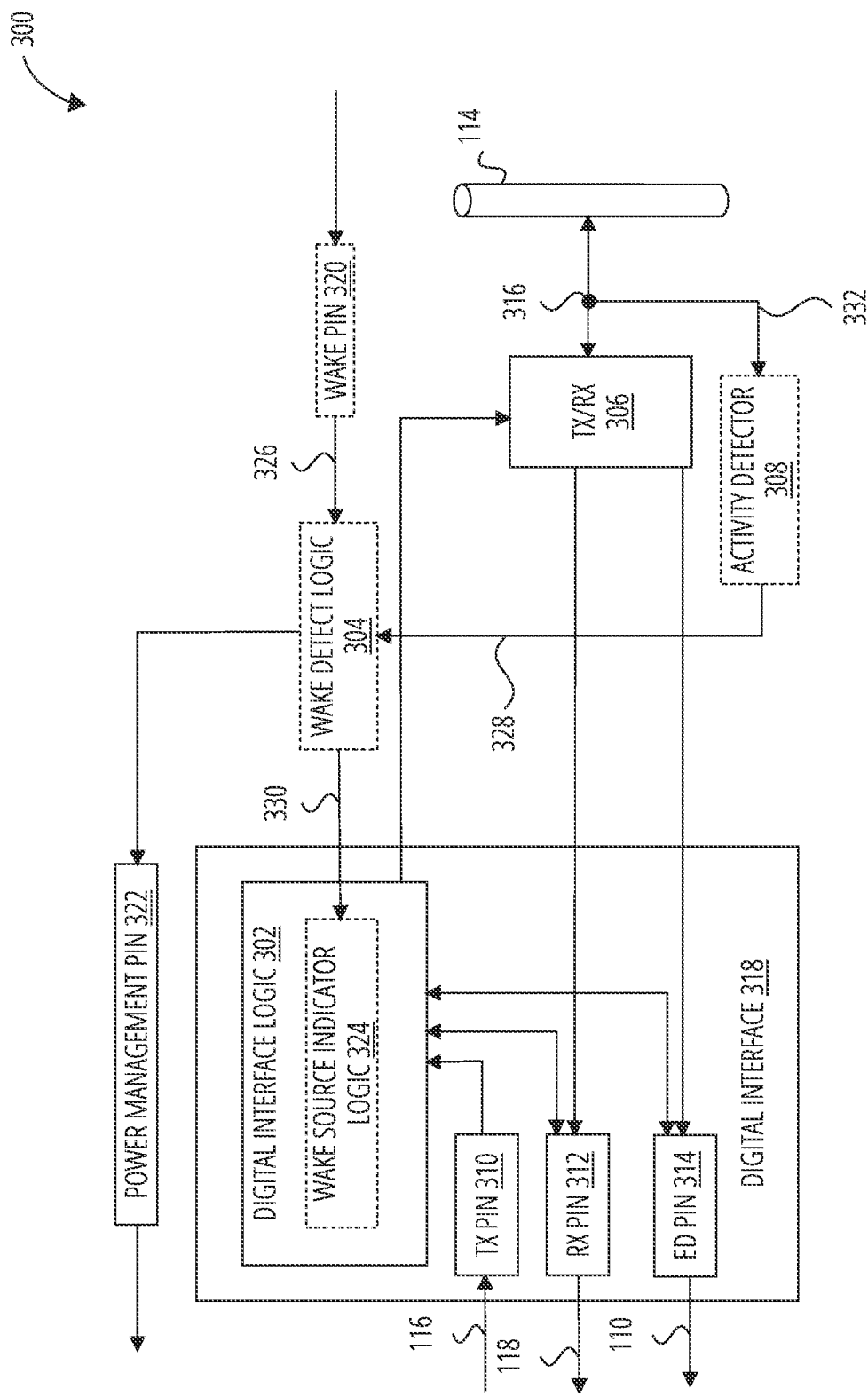
FIG. 3 is a block diagram depicting a PHY transceiver of a split-PHY, in accordance with one or more embodiments.

FIG. 3 is a block diagram depicting a PHY transceiver 300 including certain blocks configured to operate on a normal power supply or a low power supply (power supply pins not shown), in accordance with one or more embodiments. Some of the blocks that operate on a low power supply (such blocks depicted by FIG. 3 having a dotted-line border) cooperate to detect a wake signal and communicate a source of the wake signal (local or remote) to a PHY controller (not shown).

When operating on a normal power supply, transmission/reception circuitry 306 (labeled TX/RX 306) handles transmission and reception of frames to and from transmission medium 114 via bus network interface 316. Transmission/reception circuitry 306 is coupled to RX pin 312 and is configured to move frames from transmission medium 114 received at bus network interface 316 to a reception path at PHY transceiver 300 and assert a signal on RX pin 312 which RX pin 312 is connected to RX connection 118. For transmission, digital interface logic 302 is configured to prepare transmittable frames and then provide the frames to transmission/reception circuitry 306, which move the frames out to transmission medium 114 via bus network interface 316.

When PHY transceiver 300 is in a low power mode (or "sleep" state in FIG. 2), PHY transceiver 300 operates on a low power supply and does not perform normal reception and/or transmission (i.e., operations of the "xmitting" state in FIG. 2) of frames. More specifically, the transmission/reception circuitry 306 and digital interface logic 302 do not manage transmission or reception to/from transmission medium 114 while PHY transceiver 300 is in a low power mode. Activity detector 308 is provided at PHY transceiver 300 to observe signals 332 on transmission medium 114 via bus network interface 316. When activity detector 308 observes that a signal 332 on transmission medium 114 is a valid signal, such as a signal associated with Ethernet communication, without limitation, activity detector 308 asserts a remote wake indication 328 that indicates to wake detect logic 304 that a valid activity was detected.

When operating in a low power mode, PHY transceiver 300 may trigger a normal power mode by asserting a power management pin 322, waking to transition to a "boot" state and then performing a reset upon receiving a power-on-reset command to transition to a "normal" state as depicted by FIG. 2. Power management pin 322 may, as non-limiting examples, be coupled to a discrete voltage regulator enabled by assertions of power management pin 322 (e.g., INH of FIG. 9) or circuitry operative to couple/decouple an integrated voltage regulator to PHY transceiver 300 (e.g., LDO of FIG. 9 or FIG. 10).

In one or more embodiments, wake detect logic 304 of PHY transceiver 300, may trigger a change to normal power supply mode in response to assertion of a valid remote wake indication 328 by activity detector 308 or a local wake indication 326 provided by assertion of a wake pin 320.

In a split-PHY, the inventors of this disclosure appreciate that it is desirable for a PHY transceiver to communicate indication of a source (e.g., remote or local) of a wake signal to a PHY controller of the split-PHY. As a non-limiting example, a PHY controller may be configured to initiate forwarding of local or remote wake signals to wake-up other PHYs, network segments, or a network, without limitation. Digital interface 318 controls communication with the PHY controller, and a wake source indicator logic 324 provided at digital interface 318 controls communication of the indication of the source of the wake to the PHY controller. Wake source indicator logic 324, wake detect logic 304, activity detector 308 and at least a portion of wake source indicator logic 324 operate in a low power domain of PHY transceiver 300 as well as in a normal power domain of PHY transceiver 300. Each of these elements is depicted by FIG. 3 as having dotted-line borders to indicate they operate in the low power domain and in the normal power domain of PHY transceiver 300.

Wake detection logic 304, responsive to local wake indication 326 asserts wake source indication 330 to a first state and responsive to remote wake indication 328 asserts wake source indication 330 to a second state, which is different from the first state. Wake source indicator logic 324 receives wake source indication 330 asserted by wake detect logic 304, and in response, wake source indicator logic 324 communicates the respective asserted state of wake source indication 330 to a PHY controller via assertions of the RX pin 312 and ED pin 314, as discussed below, which are respectively associated with the physical connections 110, 118 of hardware interface 108.

When PHY transceiver 300 resets, it communicates the status of the reset via digital interface 318 so that, a PHY controller, as a non-limiting example, PHY controller 700 described further below, knows when PHY transceiver 300 is ready to perform normal transmission and reception.

Figure 4:
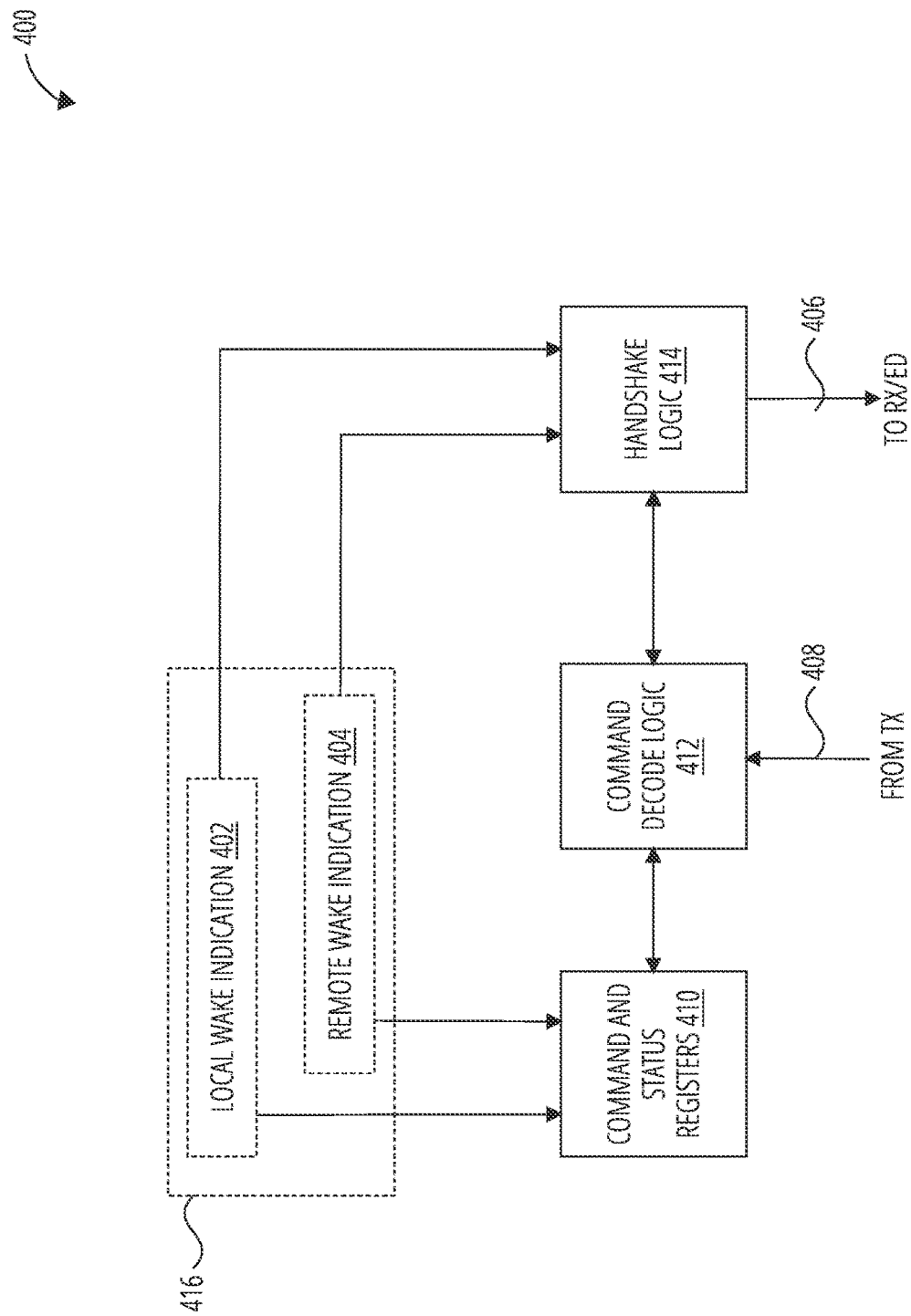
FIG. 4 is a block diagram depicting a wake source indication logic, in accordance with one or more embodiments.

FIG. 4 is a block diagram depicting a wake source indicator logic, which is a non-limiting example of wake source indicator logic 324 of FIG. 3.

Wake source indicator logic 400 includes command and status registers 410 that are set in response to one or both of local wake indications 402 (e.g., wake source indication 330 asserted to the first state responsive to asserted local wake indication 326) and/or remote wake indication 404 (e.g., wake source indication 330 asserted to the second state responsive to asserted remote wake indication 328) of wake source indications 416. Command decode logic 412 is configured to decode a command 408 at least partially based on the values stored at command and status registers 410 and sends wake indications 406 via the RX and ED pins, and receives command 408 via the TX pin.

Wake source indicator logic 400 optionally includes handshake logic 414, which is "optional" because in some embodiments, wake source indicator logic 400 may separately communicate status of a power on reset and source of wake (e.g., via wake indications 406). However, it may be more efficient to communicate via a handshake protocol known to both parties so that additional information may be provided as discussed herein. Here, handshake logic 414 is configured to control assertions of the RX/ED pins to communicate wake indications 406 including for example wake source indications 416.

In some embodiments, a PHY controller may be configured to perform a local wake forwarding, a remote wake forwarding, or both, in response to the source of a wake detection. It may be desirable for a PHY transceiver of a split-PHY to communicate a source of a detected wake signal to a PHY controller so that e.g., a PHY controller may determine the form of wake forwarding to perform (e.g., local via a local wake out pin, or remote via the shared transmission medium). Moreover, in some cases, there may be additional detected wake signals while a PHY controller waits to perform wake forwarding. It may be desirable for the PHY controller to take into account possible collisions at a shared transmission medium before performing the wake forwarding. If the source of an additional wake detection is a local wake indication, then a local or a remote wake forwarding of a current wake detection may be performed without fear of a collision at the shared transmission medium. If the source of an additional detected wake signal is a remote wake indication, then a remote wake forwarding of the current wake detection may experience a collision at the shared transmission medium.

Figure 5:
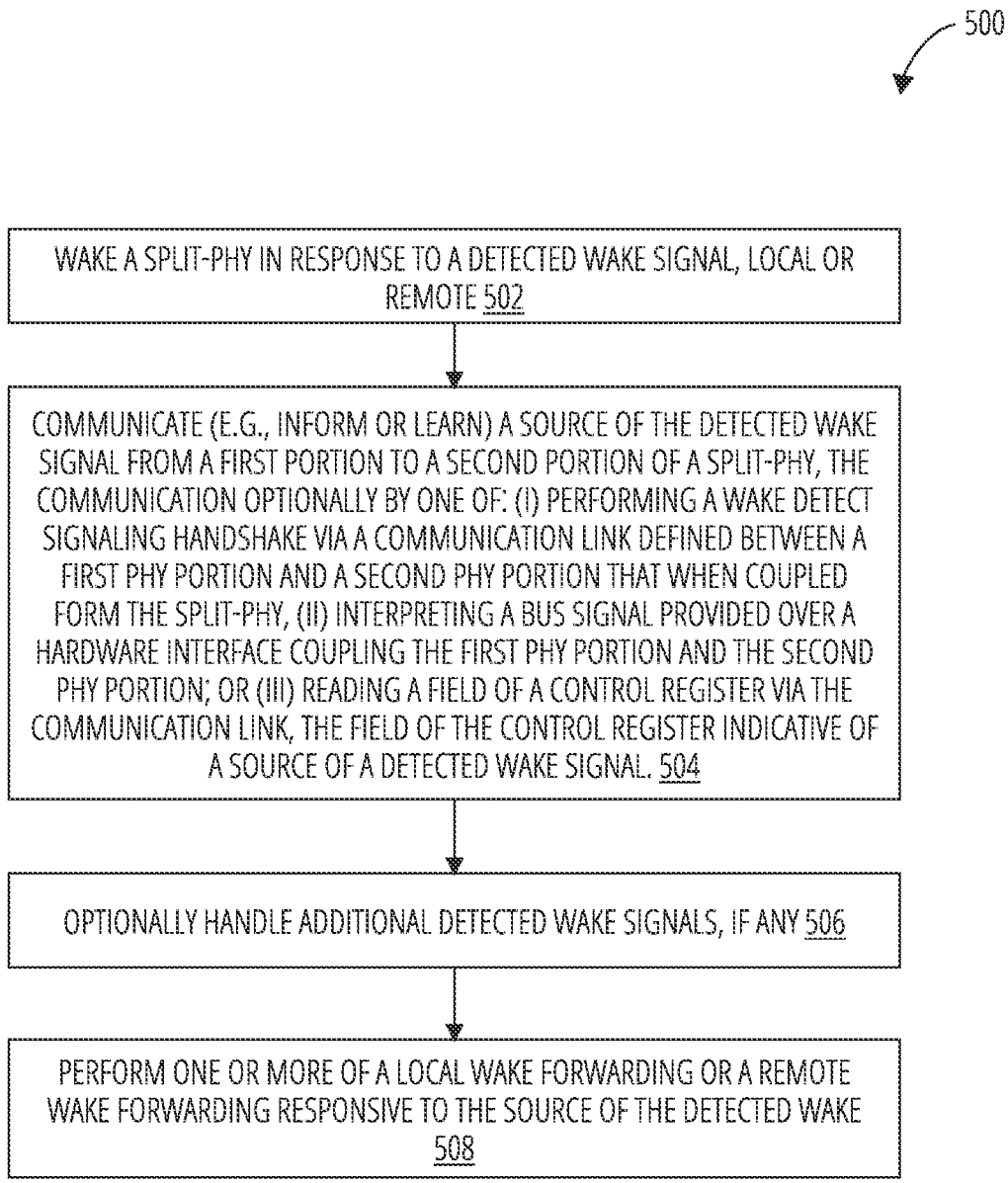
FIG. 5 is a flow diagram depicting a process for a wake process that includes a wake detect signaling handshake in accordance with one or more embodiments.

One or more embodiments relate to communicating a source of a detected wake signal, and more specifically, communicating the source via a 3-pin interface for coupling a split-PHY. FIG. 5 is a flowchart depicting a waking process 500 performed by a split-PHY that includes communicating a source of a detected wake signal, in accordance with one or more embodiments.

At operation 502, process 500 wakes a split-PHY in response to a detected wake, local or remote. In the case of a PHY transceiver, process 500 enables power supply to components of the split-PHY in an interruptible power domain. As depicted by the state diagram of FIG. 2, a power-on-reset (labeled "POR" by FIG. 2) causes the PHY transceiver to transition to a "boot" state from which it can be reset by the PHY controller and transition to a "normal" state from which it can transition to states for configuration or transmission of frames. As discussed later, some processes contemplated herein for communicating a source of a detected wake signal may be performed during a boot or normal state, and other processes may be performed in a configuration state.

At operation 504, process 500 communicates (e.g., informing or learning) a source of a detected wake signal from a first portion to a second portion of a split-PHY. The communication may be optionally by one of: (i) informing the second PHY portion of the source by performing a wake detect signaling handshake via a communication link defined between the first PHY portion and the second PHY portion (e.g., as in FIG. 6A); (ii) learning the source at the second PHY portion by interpreting a bus signal provided via a hardware interface coupling the first PHY portion and the second PHY portion; or (iii) learning the source at the second PHY portion by reading a field of a control register (e.g., of command and status registers 410, without limitation) via the communication link, the field of the control register indicative of a source of a detected wake signal.

In operation 506, process 500 optionally handles any additional detected wake signals. As discussed above, in some cases an additional wake signal may be detected while a PHY controller waits to perform wake forwarding based on the previously detected wake signal. For example, a PHY controller may observe that a later detected wake signal relates to a remote wake (e.g., if ED pin is exclusively de-asserted while the PHY transceiver is resetting as discussed later) and treat a current wake detection as a remote wake for forwarding purposes (i.e., forward to local wake in pins of other PHYs but do not forward on the shared transmission medium) so as to avoid collisions at a shared transmission medium.

In operation 508, process 500 performs one or more of a local wake forwarding or a remote wake forwarding. The type of local wake forwarding and remote wake forwarding may be performed in response to the type of wake signals communicated.

Figure 6A:
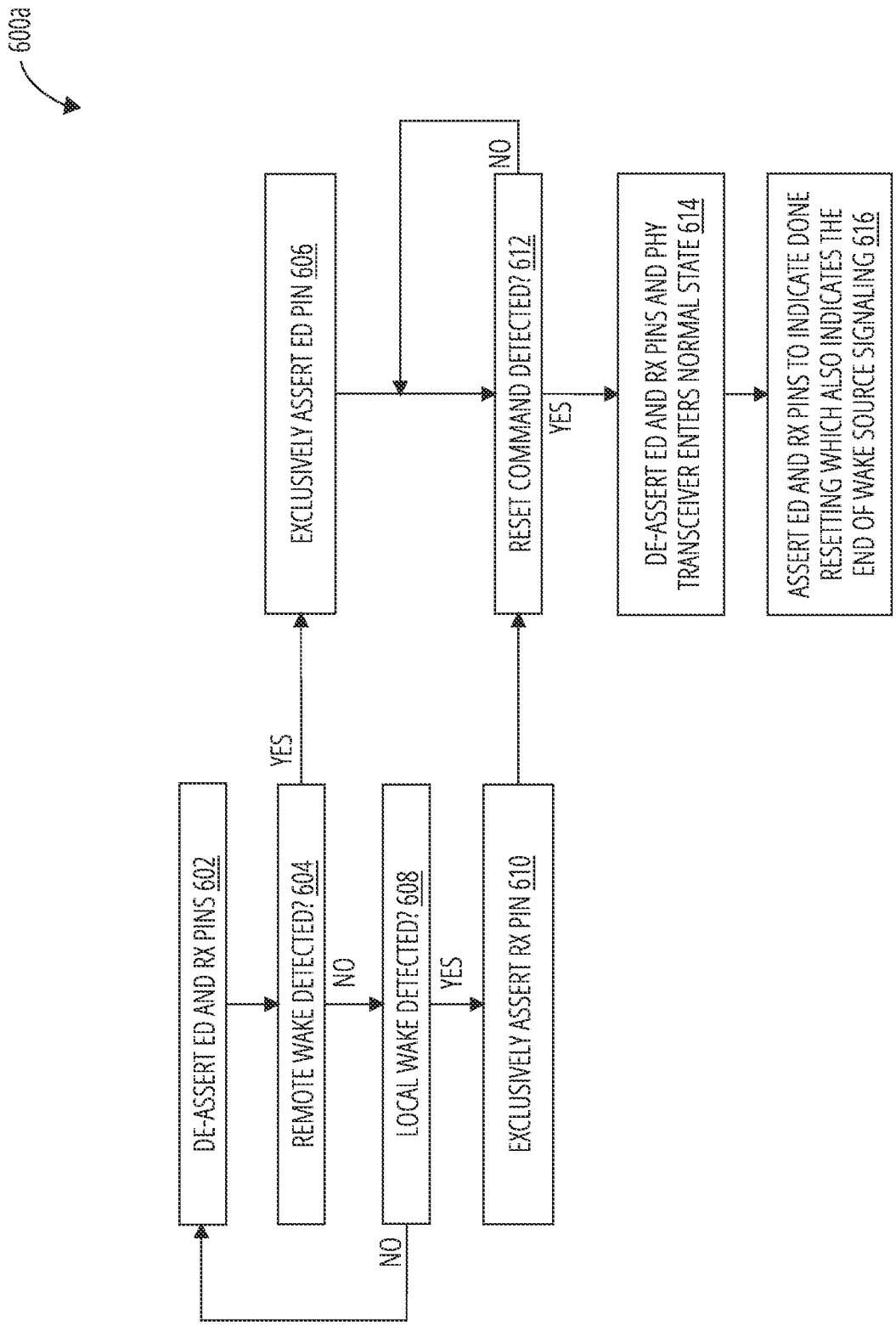
FIG. 6A is a flow diagram depicting a process for a PHY transceiver side of communicating a source of a detected wake, in accordance with one or more embodiments.
Figure 6B:
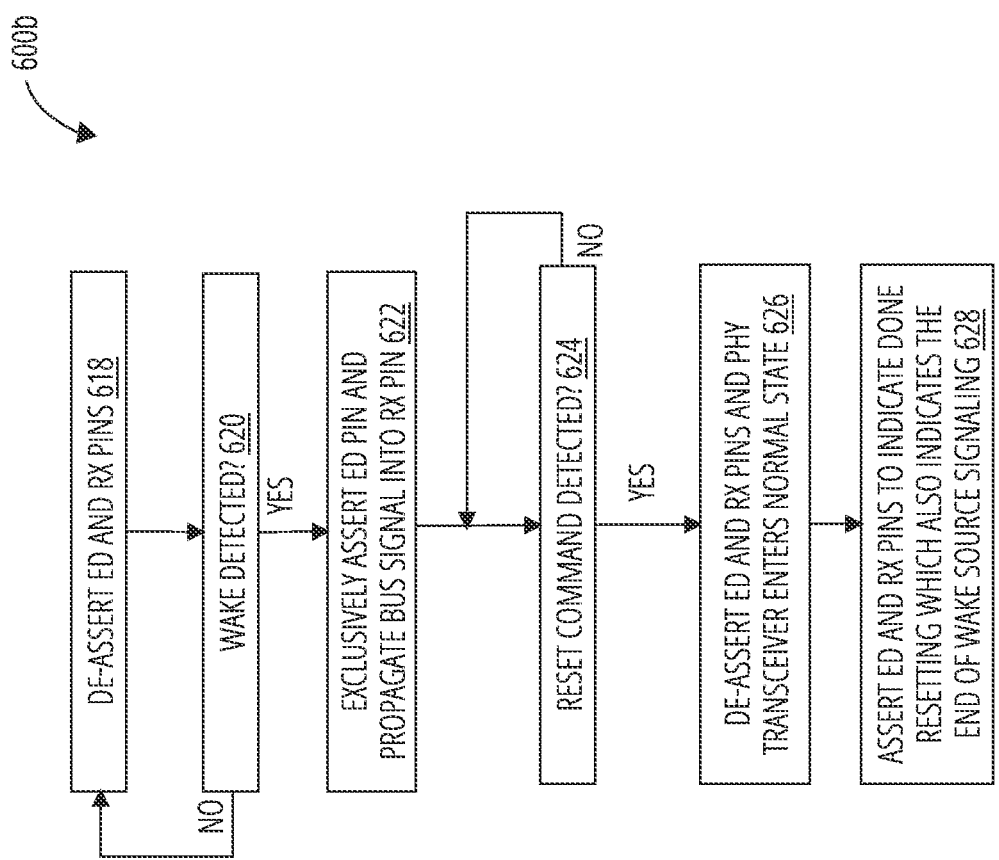
FIG. 6B is a flow diagram depicting a process for a PHY transceiver side of communicating a source of a detected wake, in accordance with one or more embodiments.
Figure 6C:
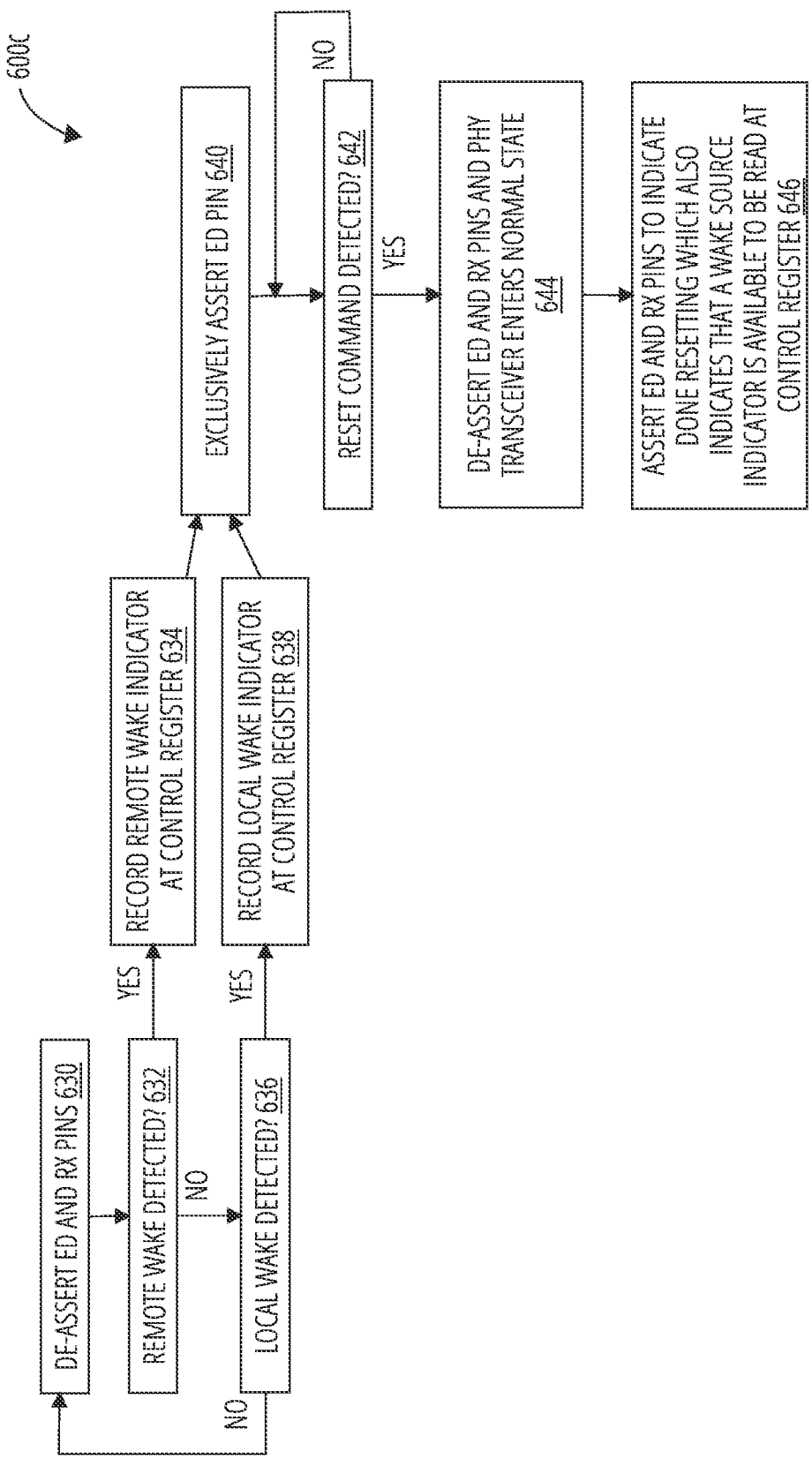
FIG. 6C is a flow diagram depicting a process for a PHY transceiver side of communicating a source of a detected wake, in accordance with one or more embodiments.

FIG. 6A, FIG. 6B and FIG. 6C, are flow diagrams depicting example embodiments for communicating a source of a detected wake signal as discussed with FIG. 5.

One or more embodiments relate to a wake source signaling handshake that may be performed over a 3-connection interface for coupling a split-PHY. The wake source signaling handshake informs the PHY controller that a wake signal was detected and the source of the detected wake signal. Such a signaling handshake may be referred to herein as a "wake source signaling handshake."

FIG. 6A is a flow diagram depicting a process 600a for a PHY transceiver side of a wake detect signaling handshake. One or more acts of process 600a may be performed, as non-limiting examples, by handshake logic 414 of wake source indicator logic 400, or wake source indicator logic 324 more generally.

At operation 602, operation 604, and operation 608, process 600a performs a detection loop waiting to detect a wake signal. At operation 602, process 600a de-asserts the ED and RX pins (e.g., set to a passive high). At operation 604, process 600a determines if a remote wake has been the source of wake source indication 330, e.g., wake source indication 330 is asserted in the second state. If not, at operation 608, process 600a determines if a local wake has been detected, e.g., wake source indication 330 is asserted in the first state. If not, process 600a returns to the beginning of the detection loop, i.e., operation 602.

If, at operation 604, process 600a determines that a remote wake was detected, at operation 606, process 600a exclusively asserts the ED pin 314 (e.g., ED pin 314 exhibits an active low signal while RX pin 312 continues to exhibit a passive high signal) to indicate that a remote wake was detected. Notably, a PHY transceiver that is implementing process 600a will transition from a sleep to a boot state in response to a detected wake (such a transitionary state labelled as "wake" in FIG. 2).

At operation 612, process 600a performs a wait loop and waits until a reset command is detected (e.g., from a PHY controller). While waiting, process 600a continues to exclusively assert the signal on the ED pin. Upon detecting a reset command, at operation 614 process 600a de-asserts the ED and RX pins (e.g., both set to passive high) and the PHY transceiver enters normal state. Notably, a PHY transceiver that is implementing process 600a will transition from a boot state to a normal state in response to a reset command (such a transitionary state labeled as "reset&EDb" in FIG. 2).

At operation 616, process 600a asserts the ED and RX pins (e.g., both set to active low) to indicate the PHY transceiver is done resetting and in a normal state (i.e., ready to perform normal transmission and reception), which also indicates the end of the end of the wake source signaling.

If, at operation 608, process 600a determines that a local wake was detected, at operation 610, process 600a exclusively asserts the RX pin (e.g., RX pin set to an active low while the ED pin remains de-asserted, i.e., set to passive high) to indicate that a local wake was detected. As indicated above, a PHY transceiver that is implementing process 600a will transition from a sleep to a boot state in response to the detected wake (such the transitionary state labelled as "wake" in FIG. 2). Upon booting, process 600a moves to operation 612 and waits for a reset command as discussed above.

FIG. 6B is a flow diagram depicting a process 600*b* for a PHY transceiver side of providing a bus signal that a PHY controller may interpret to learn the source of a wake detect. One or more acts of process 600*b* may be performed by wake source indicator logic 400 or wake source indicator logic 324 more generally, without limitation.

At operation 618 and operation 620, process 600*b* performs a detection loop waiting to detect a wake signal. At operation 618, process 600*b* de-asserts the ED and RX pins (e.g., both set to passive high). At operation 620, process 600*b* determines if a wake has been detected. If not, process 600*b* returns to the beginning of the detection loop, i.e., operation 618.

If, at operation 620, process 600*b* determines that a wake was detected, at operation 622, process 600*b* exclusively asserts the ED pin to indicate that a wake was detected and propagates a bus signal, if received, onto the RX pin. As discussed later, a wake detect logic 702 of the PHY controller 700 may interpret the bus signal (e.g., detect a predetermined remote wake frame or an Ethernet frame more generally, without limitation) and thereby detect whether or not a remote wake was the source of the detected wake. If, upon interpreting the bus signal, the wake detect logic 702 does not detect a remote wake then the PHY controller 700 may assume the source of the detected wake signal was a local wake. Notably, a PHY transceiver implementing process 600*b* will transition from a sleep to a boot state in response to a detected wake (such a transitionary state labelled as "wake" in FIG. 2).

At operation 624, process 600*b* performs a wait loop and waits until a reset command is detected (e.g., from a PHY controller). While waiting, process 600*b* continues to exclusively assert the ED pin and propagates the bus signal, if received, on the RX pin.

Upon detecting a reset command, at operation 626, process 600*b* de-asserts the ED pin and the RX pin and the PHY transceiver enters normal state. As indicated above, in some cases the RX pin was de-asserted, and in such case de-asserting the RX pin means maintaining the RX pin in its de-asserted state. Notably, a PHY transceiver implementing process 600*b* will transition from a boot state to a normal state in response to a reset command (such a transitionary state labeled as "reset&EDb" in FIG. 2).

At operation 628, process 600*b* asserts the ED and RX pins to indicate that the PHY transceiver is done resetting which also indicates the end of wake source signaling.

FIG. 6C is a flow diagram depicting a process 600*c* for a PHY transceiver side of a process for learning the source of a detected wake signal by reading a field of a control register.

At operation 630, operation 632, and operation 634, process 600*c* performs a detection loop waiting to detect a wake signal. At operation 630, process 600*c* de-asserts the ED and RX pins (passive high). At operation 632, process 600*c* determines if a remote wake has been detected. If not, at operation 636, process 600*c* determines if a local wake has been detected. If not, process 600*c* returns to the beginning of the detection loop, i.e., operation 630.

If, at operation 632, process 600*c* determines that a remote wake was detected, at operation 634 process 600*c* records a remote wake indicator at a control register. If, at operation 636, process 600*c* determines that a local wake was detected, at operation 638 process 600*c* records a local wake indictor at a control register. The respective indicators recorded at the control register are accessible (e.g., readable, without limitation) by a PHY controller when the PHY transceiver is in a configuration state.

At operation 640, process 600*c* exclusively asserts the ED pin, to indicate that a wake was detected. At operation 642, process 600*c* performs a wait loop and waits until a reset command is detected (e.g., from a PHY controller, without limitation). While waiting, process 600*c* continues to exclusively assert the ED. Upon detecting a reset command, at operation 644, process 600*c*, de-asserts the ED and RX pins (both set to passive high) and the PHY transceiver enters a normal state. As indicated above, in some cases the RX pin was de-asserted, and in such case de-asserting the RX pin means maintaining the RX pin in its de-asserted state.

At operation 646, process 600*c* asserts the ED and RX pins to indicate that the PHY transceiver is done resetting which also indicates that the indicators (remote or local) are available to be read at the control register. Fields of the control registers such as a remote or local wake indicator are available to be read by a PHY controller when a PHY transceiver is in a configuration state.

Figure 7:
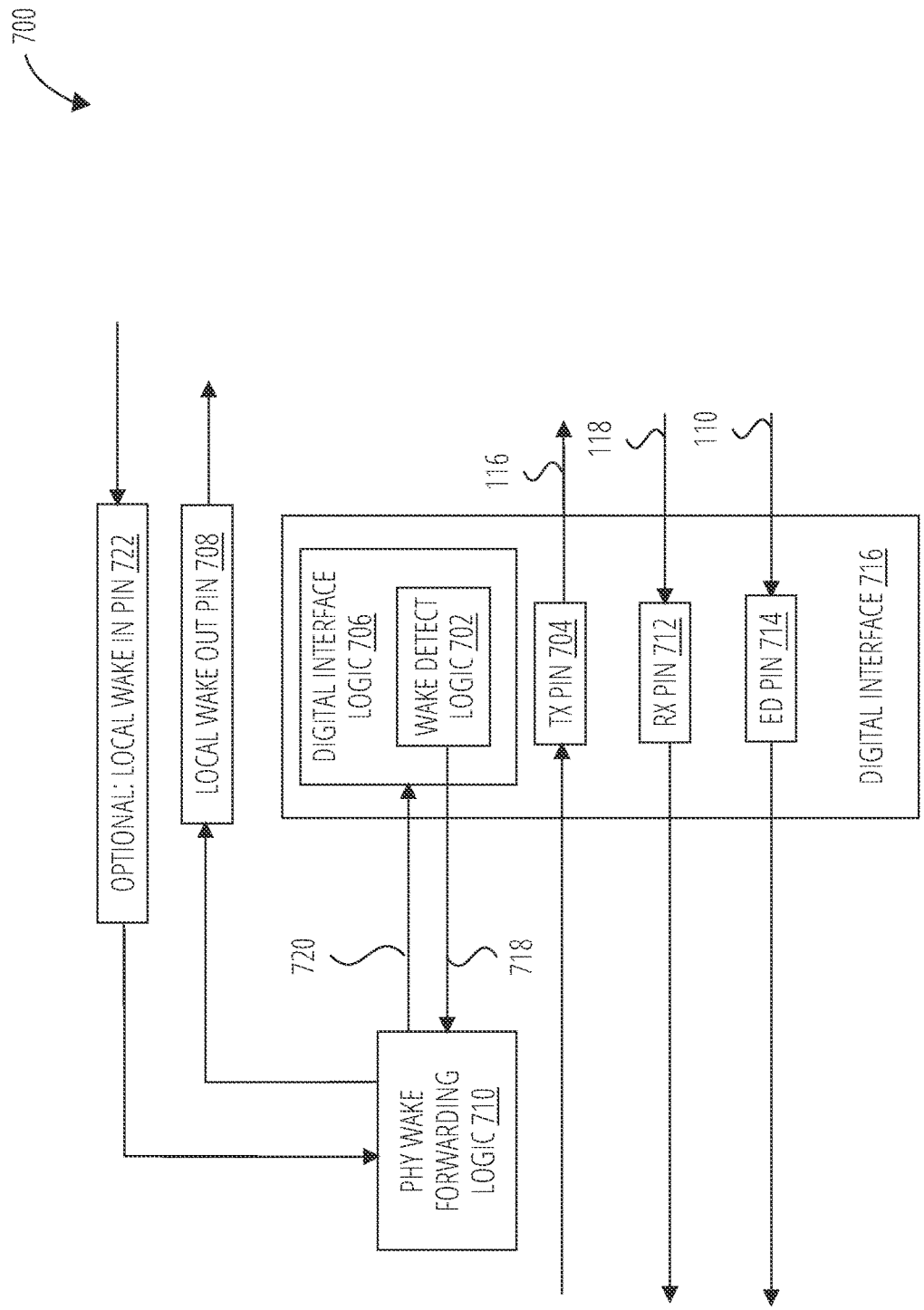
FIG. 7 is a block diagram depicting a PHY controller of a split-PHY, in accordance with one or more embodiments.
Figure 8:
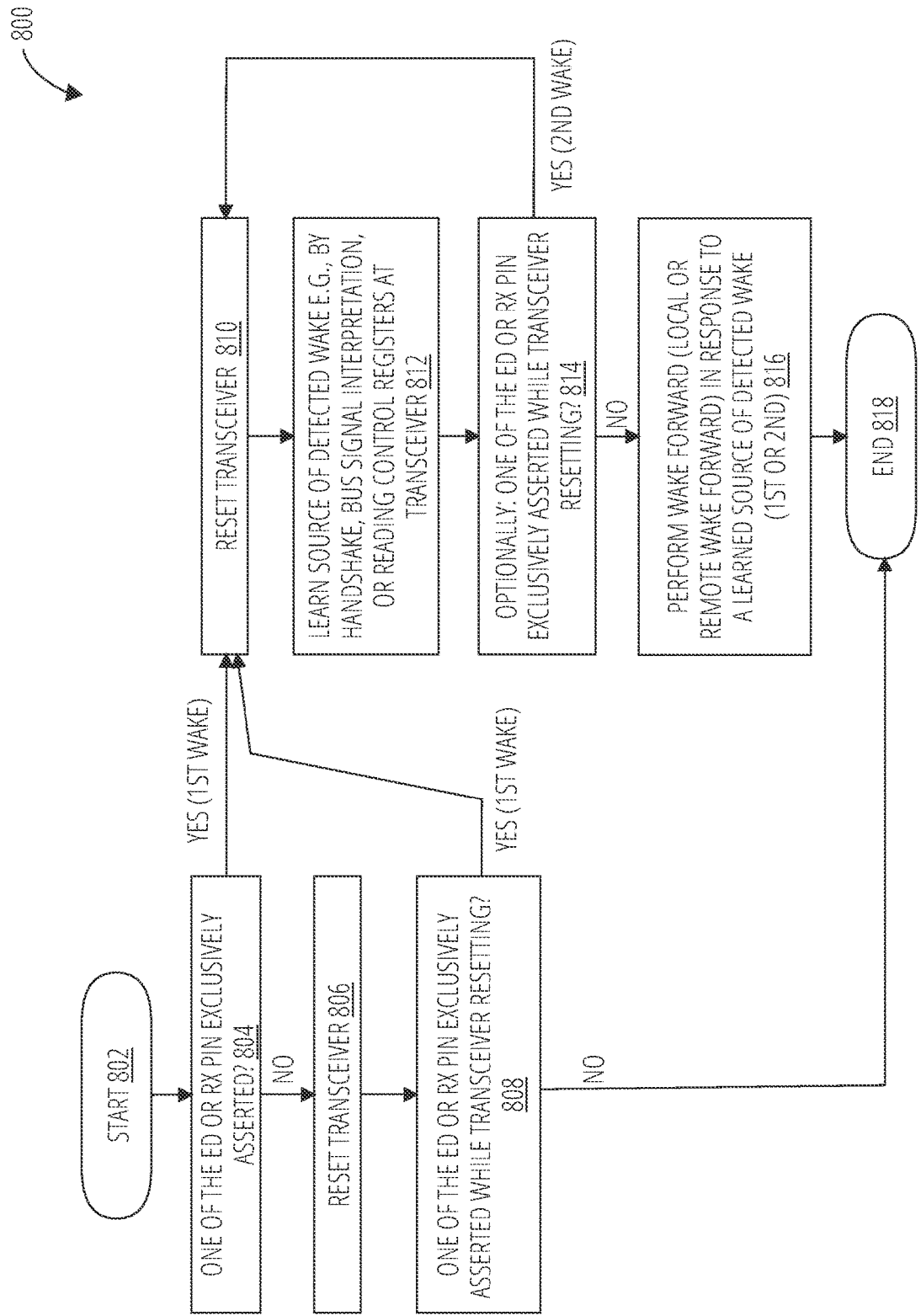
FIG. 8 is a flow diagram depicting a process for a PHY controller side of a wake detect signaling handshake, in accordance with one or more embodiments.

FIG. 7 and FIG. 8 are diagrams that relate to a PHY controller side of a split-PHY. FIG. 7 is a block diagram depicting a PHY controller 700 that includes a digital interface 716 for a low connection interface (here, a 3-connection interface) and logic for handshake signaling and performing wake forwarding discussed herein. FIG. 8 is a flowchart depicting a process performed at a PHY controller side of a wake source signaling handshake.

Turning to FIG. 7, the block diagram depicts a PHY controller 700 in accordance with one or more embodiments. PHY controller 700 includes a digital interface 716, a PHY wake forwarding logic 710, a local wake out pin 708, and an optional local wake in pin 722. Digital interface logic 706, which includes wake detect logic 702, is configured, generally, for communicating with a digital interface 318 of PHY transceiver 300 coupled to the digital interface 716 via assertions/de-assertions of TX pin 704, RX pin 712, and ED pin 714 coupled to a 3-connection (i.e., 3 pin) hardware interface discussed herein.

PHY wake forwarding logic 710 is configured, generally, to perform wake forwarding when PHY controller 700 learns about a wake signal detected at a coupled PHY transceiver or learns locally via optional local wake out pin 722. That is, to send a local wake signal toward the local wake out pin 708, send a remote wake signal toward the transmission medium 114 via commands 720 communicated via the digital interface 716, or both.

In one or more embodiments, PHY wake forwarding logic 710 may learn about a detected wake and a source thereof via wake indications 718 from wake detect logic 702, which wake detect logic 702 may be configured to perform, e.g., a wake source signaling handshake, reading a control register, or interpreting bus signals, without limitation, as discussed herein, including via TX pin 704, RX pin 712 and ED pin 714.

In one or more embodiments, PHY wake forwarding logic 710 may learn about a detected wake and a source thereof via wake indications 718 from wake detect logic 702, which wake detect logic 702 may be configured to perform, e.g., a wake source signaling handshake, reading a control register, or interpreting bus signals, without limitation, as discussed herein, including via TX pin 704, RX pin 712 and ED pin 714.

In one or more embodiments, PHY wake forwarding logic 710 may include an optional local wake in pin 722 for receiving wake signals directly from other PHYs controllers in a network segment, such as PHY controllers provided at a switch or station.

In one or more embodiments, a disclosed PHY controller may include a single digital interface 716 for coupling with a single PHY transceiver, or include multiple digital interfaces 716 each for individually coupling with one of multiple PHY transceivers. In one or more embodiments, such multiple PHY transceivers may couple to multiple different shared transmission mediums. A disclosed PHY controller may be configured to learn a source of a wake signal from one or more coupled PHY transceivers. In one or more embodiments, a disclosed PHY controller may be configured to receive a wake indication from a coupled PHY transceiver, receive a wake signal directly from another device at local input of the PHY controller, and via combinations thereof—all without exceeding the scope of this disclosure.

FIG. 8 is a flow diagram depicting a process 800 for a PHY controller side of a wake source signaling handshake. Process 800 starts at start operation 802 with the PHY controller in a powered sleep or idle state that transitions into the remaining acts of the process for example because an interruptible power supply begins to supply power to the PHY controller.

At operation 804, process 800 detects if one of the ED and RX pins is exclusively asserted (e.g., active low). If both are de-asserted (e.g., passive high), then no wake detection is being signaled and the controller resets the transceiver in operation 806. If process 800 determines that one of the ED or RX pins is exclusively asserted, then at operation 810, process 800 resets the transceiver (e.g., sends a RESET command over the TX pin). At operation 812, process 800 learns a source of a detected wake in response to, as a non-limiting example, one of the processes discussed with respect to FIG. 6A, 6B or 6C.

At operation 814, process 800 determines if the ED or RX pin was exclusively asserted while the PHY transceiver was resetting from the reset of operation 810. If so, that would indicate a second wake was detected by the PHY transceiver and so process 800 loops back to operation 810 and operation 812 to reset the PHY transceiver (at operation 810) and learn the source of the detected second wake (at operation 812).

At operation 816, process 800 performs a wake forward in response to a learned source of the detected wake (or "wakes" if more than one wake was detected). If only one wake was detected and it was a local wake, then process 800 may forward the wake on one or both of (i) the local wake out pin 708, and (ii) the shared transmission medium (e.g., via the TX pin of the digital interface 716). If only one wake was detected and it was a remote wake, then process 800 may forward the wake on local wake out pin 708 but not on the transmission medium—otherwise a collision may occur. If a second wake was detected prior to forwarding the first wake, and the second wake was a remote wake, then the first wake is forwarded solely over the local wake out pin 708, even though it was a local wake that would otherwise be forwarded over both the local wake out pin 708 and a shared transmission medium.

Returning to operation 804, if both ED and RX pins are de-asserted (e.g., passive high) that indicates the state transition and therefore process 800 was not initiated by a wake detect signal. Nevertheless, the PHY controller is awake so at operation 806, as described above, process 800 resets the transceiver (i.e., sends a reset command). At operation 808, process 800 determines if one of the ED or RX pin is exclusively asserted while the PHY transceiver was resetting. If so, that would indicate a late wake was detected at the PHY transceiver (this would be the first detected wake in the particular execution of process 800) while the PHY transceiver was resetting. If a late wake was detected, then process 800 resets the transceiver at operation 810 and continues as discussed above. If a late wake does not occur while the PHY transceiver is resetting from the reset of operation 808, then at operation 818, process 800 ends without forwarding any wake signals.

PHY Transceiver Packages

As discussed herein, one benefit of communicating that a wake was detected is that a PHY controller and a PHY transceiver may operate in multiple power modes, including a low power mode and a normal power mode. They can transition between power modes in response to detected wakes. A PHY transceiver can initiate supply of power to the split-PHY in response to detected wake signals. While pins may be added to a PHY transceiver to perform these functions, limiting the number of pins of a PHY transceiver package may be desirable for cost reasons.

Figure 9:
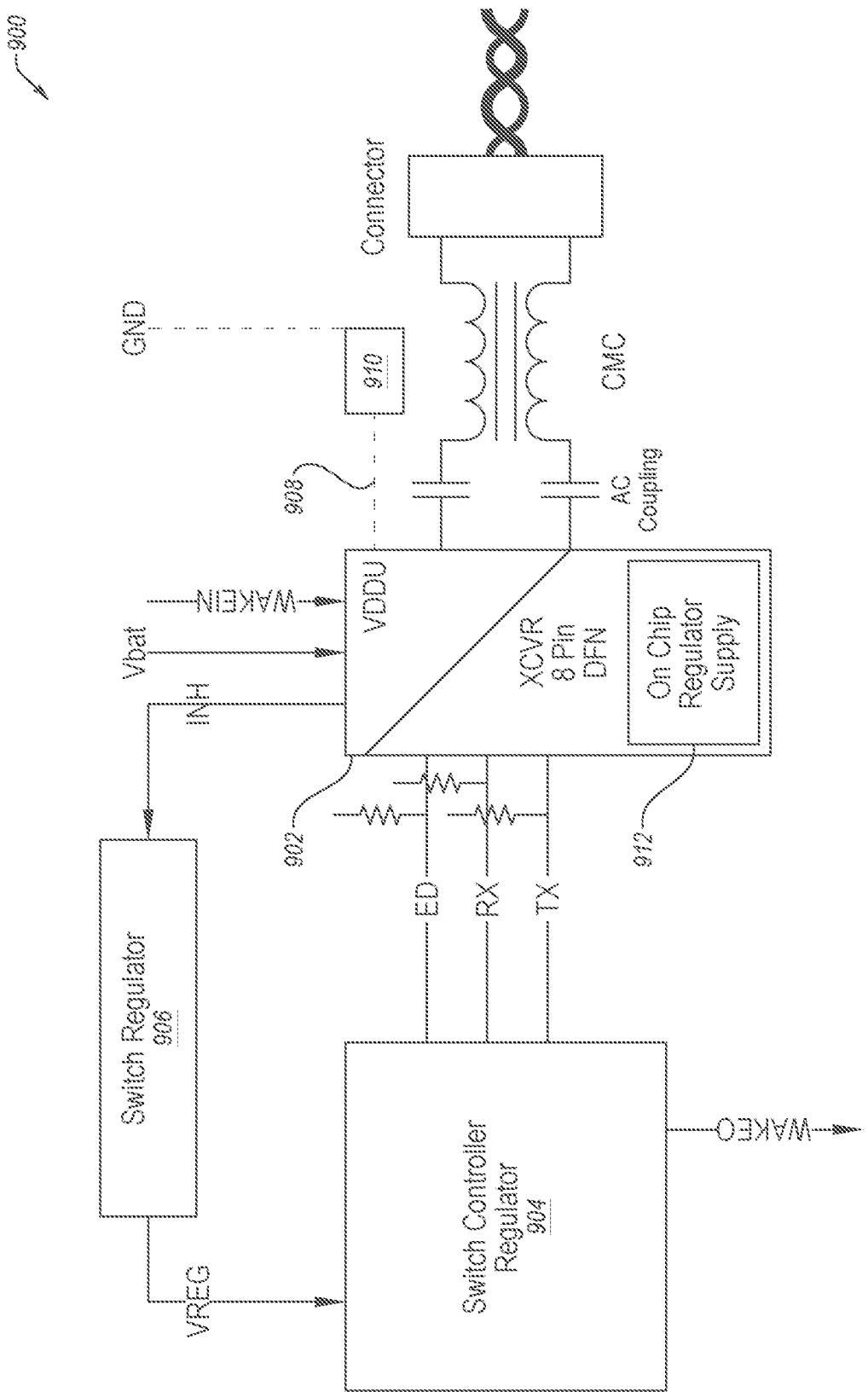
FIG. 9 is a block diagram depicting a split-PHY, in accordance with one or more embodiments.
Figure 10:
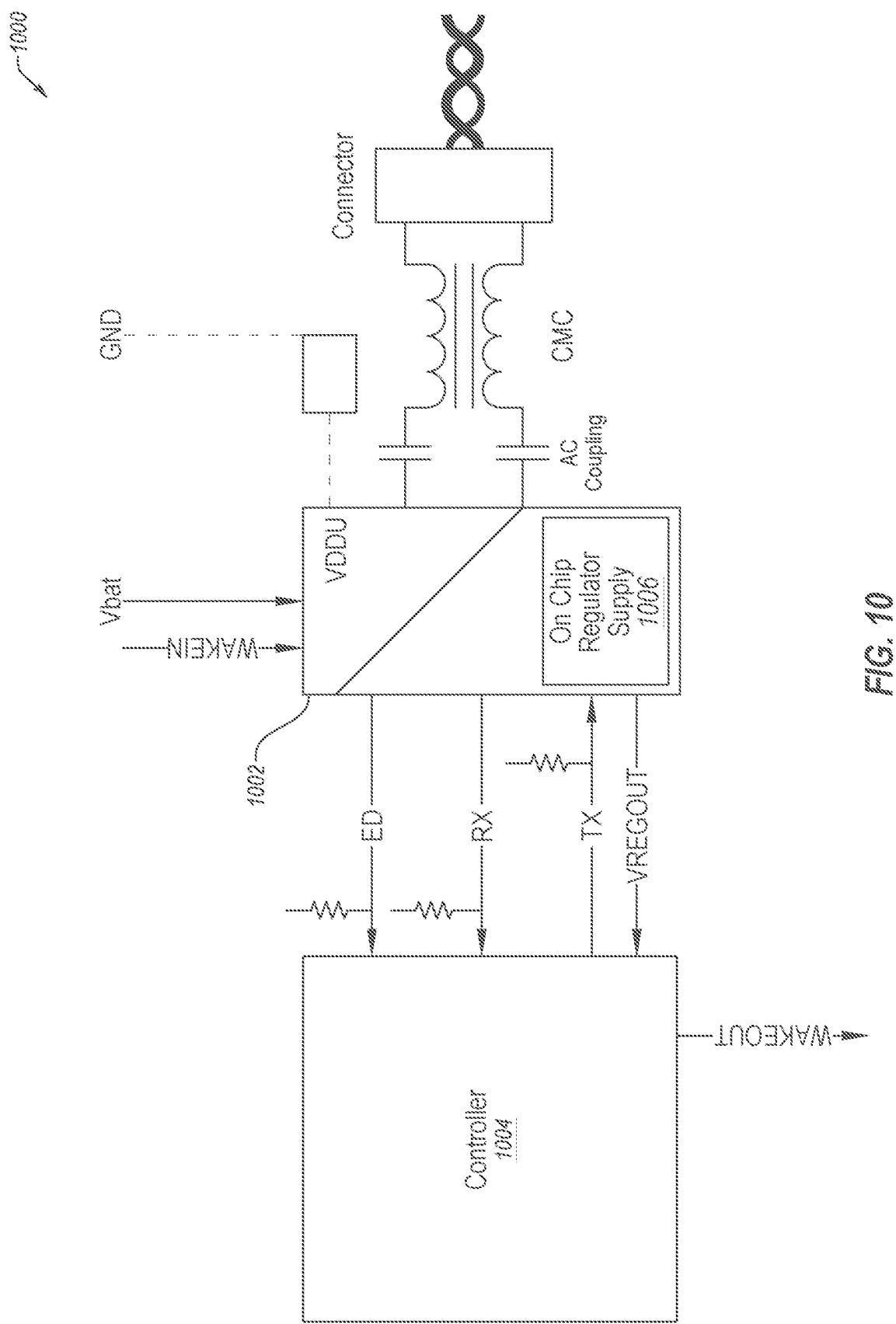
FIG. 10 is a block diagram depicting a split-PHY, in accordance with one or more embodiments.

FIG. 9 and FIG. 10 are block diagrams depicting different pin assignments, for example, for 8-pin packages including PHY transceiver 300, in accordance with one or more embodiments.

A first number of the pins are associated with a hardware interface of a physical layer transceiver and a physical layer controller that, when operatively coupled, form a split arrangement physical layer. A second number of the pins are associated with a shared transmission medium. A third number of the pins are associated with a power supply. The third number of the pins include a pin associated with an uninterruptible power supply. A fourth number of pins are associated with a local wake. Notably, a ground pin is not present in the pin assignments depicted by FIG. 9 and FIG. 10. Instead of a pin having a ground assignment, a conductive mass (e.g., a heat slug of a semiconductor package, without limitation) arranged separately from the pins and internally connected to the circuitry of the physical layer transceiver forms a portion of a ground path for the circuitry of the physical layer transceiver.

Turning to FIG. 9, two pins (i.e., of the second number of pins) of a PHY transceiver 902 are assigned for AC coupling; one pin (i.e., of the fourth number of pins) is assigned to a local wake signal, WAKEIN (as described above in relation to wake pin 320); one pin (i.e., of the third number of pins) is assigned to a supply voltage, Vbat (i.e., an uninterrupted power supply); one pin (i.e., of the first number of pins), ED, is assigned to a valid signal (as described above in relation to ED pin 314); one pin (i.e., of the first number of pins), RX, is assigned to a reception signal (as described above in relation to RX pin 312); one pin (i.e., of the first number of pins), TX, is assigned to a transmission signal (as described above in relation to TX pin 310); and one pin (i.e., of a fifth number of pins), INH, is assigned to a power management signal (as described above in relation to power management pin 322). A conductive mass 910 that is grounded is arranged separately from the pins (such as a heat slug, without limitation) is coupled to the circuitry of PHY transceiver 902 via an internal connection 908 and forms a portion of the ground path for the circuitry of PHY transceiver 902. Notably, by using conductive mass 910 to form a portion of the ground path, a pin assignment for ground is not necessary.

Split-PHY 900 includes a switched voltage regulator, denoted Switched Regulator 906, that when on generates a regulated supply voltage. An enable pin (not depicted) of Switched Regulator 906 is coupled to the pin INH (also referred to herein as a "power management pin") of PHY transceiver 902. Generation of the regulated supply voltage by Switched Regulator 906 is controlled (e.g., turned on or off) in response to assertions of pin INH by PHY transceiver 902. A voltage supply pin of PHY controller 904, VREG, is coupled to the output of Switched Regulator 906 such that PHY controller 904 may receive the regulated supply voltage when Switched Regulator 906 is turned on.

Notably, the supply voltage coupled to Vbat is an uninterruptible power supply and as non-limiting examples may be provided by a battery, another voltage regulator or some other voltage source. Voltage supply pin VREG provides an interruptible power supply.

PHY transceiver 902 is supplied power for normal operation via an on-chip regulator supply 912 (such as an on-chip low drop out regulator (LDO), without limitation) of an electronic circuit (i.e., a chip) that includes Split-PHY 900. Integrated circuitry may couple PHY transceiver 902 to on-chip regulator supply 912 for power during normal operation. By using on-chip regulator supply 912 and internal connection 908 to conductive mass 910, PHY transceiver 902 may be implemented in an 8 pin package where one of the pins that might otherwise be used for ground and an interruptible power supply may be used for local wake signals (WAKEIN) and another pin for power management signals (INH).

Turning to FIG. 10, similar to the pin assignment depicted by FIG. 9, two pins (i.e., the second number of pins) of PHY transceiver 1002 of Split-PHY 1000 are assigned for AC coupling (as described above in relation to bus network interface 316); one pin (i.e., the third number of pins) is assigned to a supply voltage Vbat (i.e., an uninterrupted power supply); one pin (i.e., of the fourth number of pins) is assigned to a local wake signal WAKEIN (as described above in relation to wake pin 320); one pin (i.e., of the first number of pins) is assigned to a valid signal ED (as described above in relation to ED pin 314); one pin (i.e., of the first number of pins) is assigned to a reception signal RX (as described above in relation to RX pin 312); and one pin (i.e., of the first number of pins) is assigned to a transmission signal TX (as described above in relation to TX pin 310). No pin is assigned to ground. The pin (i.e., of the fifth number of pins) assigned to the power management signal INH by PHY transceiver 902 of FIG. 9 is, in FIG. 10, instead assigned to a regulated supply voltage output VREGOUT provided by PHY transceiver 1002 to a power supply pin of PHY controller 1004.

On-chip regulator supply 1006 is used to supply PHY transceiver 1002 and to supply PHY controller 1004 via regulated supply voltage output VREGOUT. Switched Regulator 906 in the arrangement depicted by FIG. 9 is not present in FIG. 10, thus, the arrangement depicted by FIG. 10 eliminates a large discrete component of the arrangement depicted by FIG. 9, i.e., Switched Regulator 906.

Digital Circuitry Integrity Checker

The inventors of this disclosure appreciate that signal and data integrity may be compromised at digital-to-analog and analog-to-digital boundaries of a split-PHY. In a typical data integrity check of the boundary circuitry of a PHY controller and PHY transceiver, a PHY controller may send a data integrity frame from the PHY controller to the PHY transceiver for transmission to a shared transmission medium. During normal operation of a PHY transceiver, when a transmit frame (data integrity frames or otherwise) is moved onto a shared transmission medium the transmit frame is provided back to the PHY controller via a normal reception path as signals detected on the shared transmission medium via the RX and ED signals (i.e., via RX connection 118 and ED connection 110) where the frame is decoded and the data recovered (e.g., a integrity data, without limitation) and compared to the original integrity data. So, typically there is a built-in loopback function via the PHY transceiver for providing a data integrity frame to a PHY controller for analysis.

The inventors of this disclosure now appreciate that in a split-PHY, it may be desirable to include support for data integrity checks of the circuitry of a PHY controller without involving a PHY transceiver. As non-limiting examples, integrity of the PHY controller's circuitry may be checked without waking up the PHY transceiver if there is a desire to let a PHY transceiver remain in a low power mode, when a shared transmission medium is busy, or when it is not the split-PHY's turn to transmit on the shared transmission medium.

Circuitry may be included in a digital interface of a PHY controller or a hardware interface to couple/de-couple a transmission path to a reception path during an integrity check. However, information discerned from such a data integrity frame may be different than expected because, in the typical arrangement discussed above, the electrical signals of a transmit frame (data integrity frame or otherwise) are typically characterized and/or conditioned at the PHY transceiver before being moved onto the shared transmission medium and simultaneously looped back to the PHY controller. Those data integrity frames are decoded on the reception path of the PHY controller like any other received frame, and the standard decoding applied to a received frame typically accounts for the characterization and/or conditioning of the electrical signals at a PHY transceiver. If the standard decoding is applied to a frame that was not characterized and/or conditioned, then that may result in erred bits in recovered integrity data and thus, incorrect results from analysis of the integrity data.

One or more embodiments relate, generally, to checking the integrity of digital circuitry at a PHY controller without cooperation with a PHY transceiver. Circuitry provided at a digital interface of a PHY controller frequency encodes a data integrity frame such that the encoded data integrity frame is substantially consistent with a frame that would be conditioned and/or characterized by a PHY transceiver. The circuitry provides the encoded data integrity frame to the reception path of the PHY controller where the integrity data is recovered by applying standard decoding and then analyzed.

Figure 11:
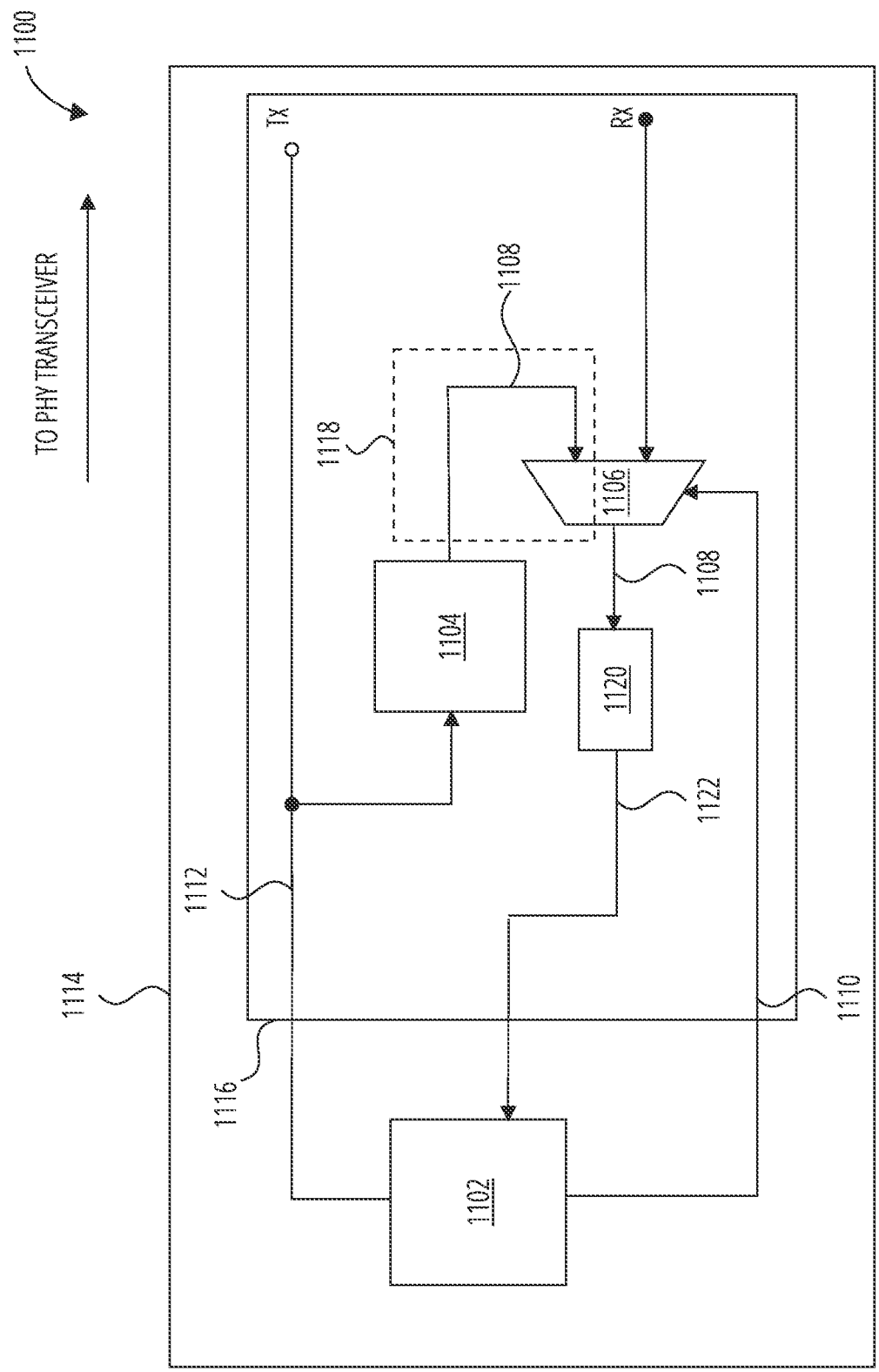
FIG. 11 is a block diagram depicting a circuitry for data integrity checking at a split-PHY, in accordance with one or more embodiments.

FIG. 11 is a block diagram depicting a circuitry 1100 for enabling data integrity checks at a PHY controller 1114 coupleable to a PHY transceiver (not shown) via a digital interface 1116, in accordance with one or more embodiments. In the example depicted by FIG. 11, connections to a TX pin (TX) and an RX pin (RX) of a digital interface on the PHY transceiver side (e.g., digital interface 318 of FIG. 3) are in an open state (i.e., high impedance state).

A down-frequency encoder 1104 and a loopback circuit 1118 are provided at digital interface 1116 (e.g., implemented in the integrated circuitry thereof). In a contemplated operation, digital circuitry integrity checker 1102 is configured to send a data integrity frame 1112 to loopback circuit 1118 that is configured to be enabled at least partially in response to selection signal 1110 (discussed later) asserted by digital circuitry integrity checker 1102. The contents of data integrity frame 1112 may include a checksum or other sequence.

When digital circuitry integrity checker 1102 sends data integrity frame 1112 to the TX path, down-frequency encoder 1104 coupled to the TX path receives the data integrity frame 1112 and applies down-frequency encoding to data integrity frame 1112 to encode the frame at a bit rate expected to be similar to a frame passing through a PHY transceiver and generates down-frequency encoded frame 1108.

Down-frequency encoder 1104 is arranged to provide down-frequency encoded frame 1108 to loopback circuit 1118. Loopback circuit 1118 is arranged to carry down-frequency encoded frame 1108 toward a reception path (RX) that includes a MUX 1106 and sampling decoder 1120, and toward digital circuitry integrity checker 1102.

Digital circuitry integrity checker 1102 enables loopback circuit 1118 by controlling MUX 1106 (i.e., a multiplexer (MUX)) via selection signal 1110 coupled to MUX 1106. MUX 1106 selects the down-frequency encoded frame 1108 from among its available inputs in response to the asserted selection signal 1110. Another input of MUX 1106 is coupled to the RX pin of digital interface 1116. In this manner, digital circuitry integrity checker 1102 can alternately enable and disable loopback circuit 1118/normal reception path RX as desired.

Down-frequency encoded frame 1108 is provided to a sampling decoder 1120 via loopback circuit 1118. Sampling decoder 1120 is configured to apply up-frequency decoding to down-frequency encoded frame 1108 if selection signal 1110 is asserted, or to up-frequency decoding to a signal received on the RX pin of digital interface 1116 if selection signal 1110 is not asserted, and obtain recovered data 1122, which if selection signal 1110 is asserted represents data integrity frame 1112. In one or more embodiments, frequency decoding applied by sampling decoder 1120 to down-frequency encoded frame 1108 may be configured to decode one or more of up-frequency encoding applied when data integrity frame 1112 was generated and down-frequency encoding applied by down-frequency encoder 1104. Recovered data 1122 is provided to digital circuitry integrity checker 1102, which compares (bit-by-bit comparison) recovered data 1122 to integrity data sent in data integrity frame 1112 to determine if the data matches. Results of the comparison may be stored or used as desired, for example, to determine the integrity of digital circuitry at PHY controller 1114.

Figure 12:
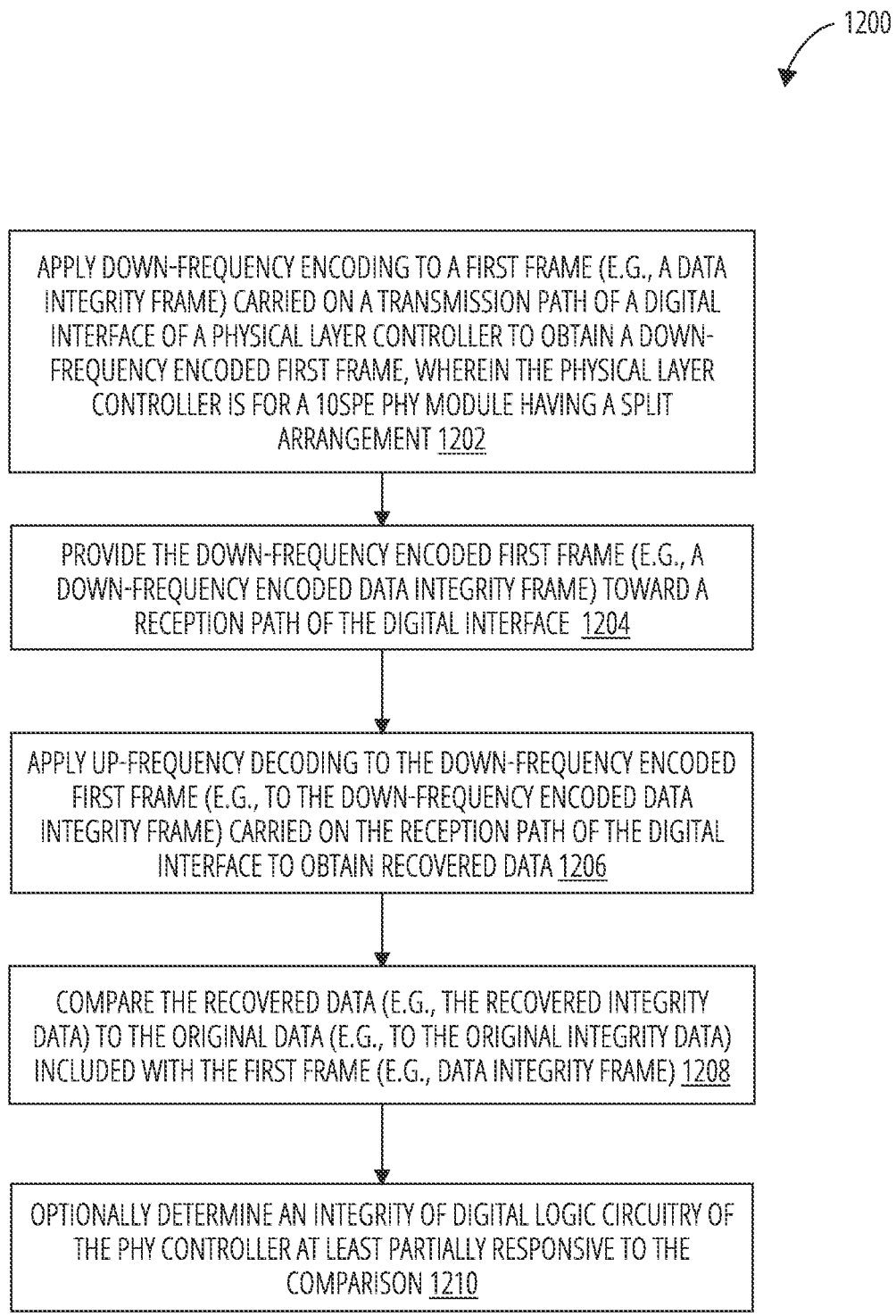
FIG. 12 is a flow diagram depicting a process for data integrity checking at a split-PHY, in accordance with one or more embodiments.

FIG. 12 is a flowchart depicting a process 1200 for performing data integrity checks at a PHY controller of a split-PHY, in accordance with one or more embodiments, such as at a PHY controller 1114.

At operation 1202, process 1200 applies down-frequency encoding to a first frame (e.g., a data integrity frame that includes integrity data) carried on a transmission path coupled to a digital interface of the PHY controller to obtain a down-frequency encoded first frame (data integrity frame). The digital interface is configured to operatively couple the PHY controller to a PHY transceiver. When coupled, the PHY controller and PHY transceiver form a 10SPE PHY module that has a split arrangement.

At operation 1204, process 1200 provides the down-frequency encoded first frame (e.g., a down-frequency encoded data integrity frame) toward a reception path of the digital interface. A loopback circuit such as loopback circuit 1118 may be enabled to convey the down-frequency encoded first frame from the transmission path toward the reception path by, for example, controlling selection at a multiplexer such as discussed with respect to FIG. 11.

At operation 1206, process 1200 applies up-frequency encoding to the down-frequency encoded first frame (e.g., the down-frequency encoded data integrity frame) on the reception path of the digital interface to obtain a recovered data.

At operation 1208, process 1200 compares (e.g., performs a bit-wise comparison) the recovered data to the original data included with the first frame (e.g., the original integrity data included in the data integrity frame).

At operation 1210, process 1200 optionally determines an integrity of digital logic circuitry of the PHY controller at least partially in response to the comparison.

It will be appreciated by those of ordinary skill in the art that functional elements of embodiments disclosed herein (e.g., functions, operations, acts, processes, and/or methods) may be implemented in any suitable hardware, software, firmware, or combinations thereof. FIG. 16 depicts non-limiting examples of implementations of functional elements disclosed herein. In some embodiments, some or all portions of the functional elements disclosed herein may be performed by hardware specially configured for carrying out the functional elements.

Figure 13:
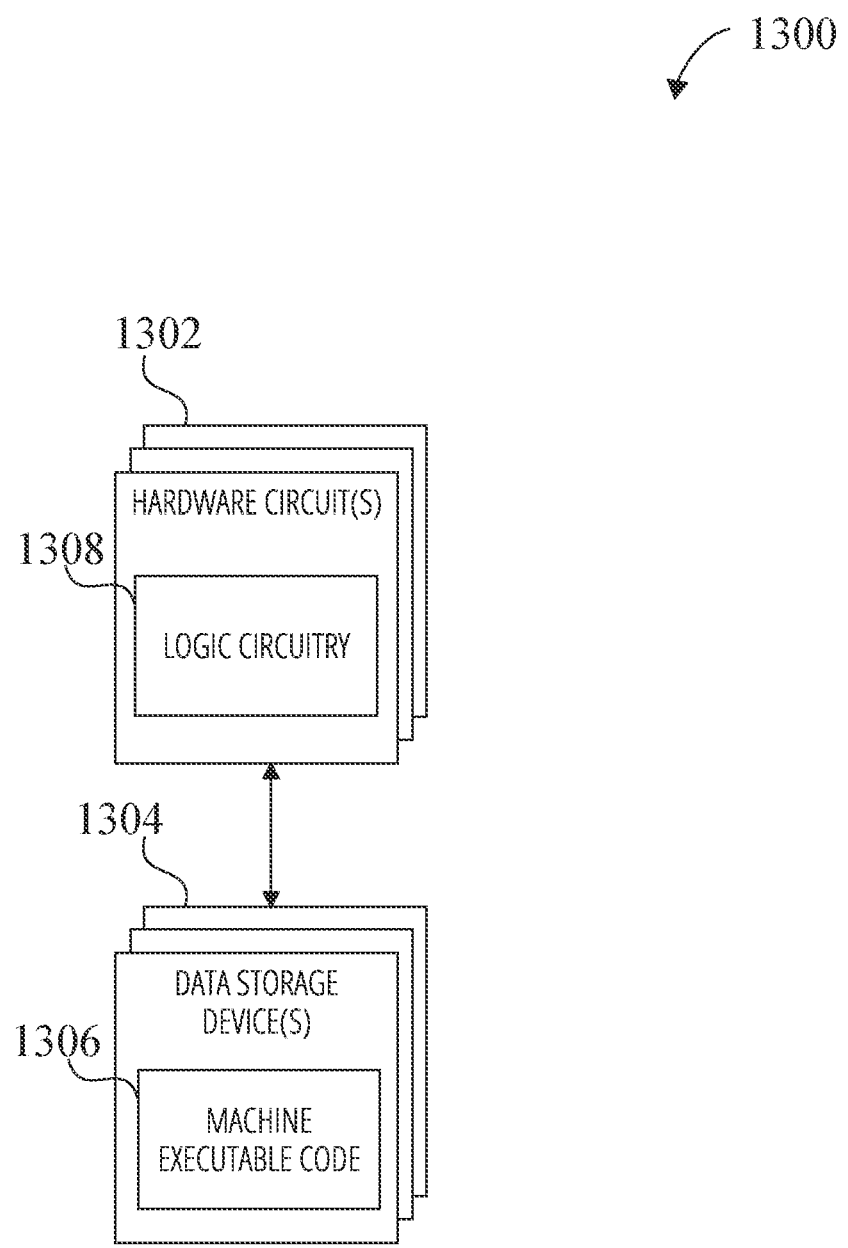
FIG. 13 is a block diagram depicting a circuitry for performing some or a totality of the features or elements of disclosed for one or more embodiments.

FIG. 13 is a block diagram of circuitry 1300 that, in some embodiments, may be used to implement various functions, operations, acts, processes, and/or methods disclosed herein. The circuitry 1300 includes one or more processors (sometimes referred to herein as "processors 1302") operably coupled to one or more data storage devices (sometimes referred to herein as "storage 1304"). The storage 1304 includes machine executable code 1306 stored thereon and the processors 1302 include logic circuitry 1308. The machine executable code 1306 includes information describing functional elements that may be implemented by (e.g., performed by) the logic circuitry 1308. The logic circuitry 1308 is adapted to implement (e.g., perform) the functional elements described by the machine executable code 1306. The circuitry 1300, when executing the functional elements described by the machine executable code 1306, should be considered as special purpose hardware configured for carrying out functional elements disclosed herein. In some embodiments the processors 1302 may be configured to perform the functional elements described by the machine executable code 1306 sequentially, concurrently (e.g., on one or more different hardware platforms), or in one or more parallel process streams.

When implemented by logic circuitry 1308 of the processors 1302, the machine executable code 1306 is configured to adapt the processors 1302 to perform operations of embodiments disclosed herein. For example, the machine executable code 1306 may be configured to adapt the processors 1302 to perform at least a portion or a totality of the blocks and processes depicted by FIGS. 1 to 12. As another example, the machine executable code 1306 may be configured to adapt the processors 1302 to perform at least a portion or a totality of the operations discussed for a split-PHY discussed herein.

As a specific, non-limiting example, the machine executable code 1306 may be configured to adapt the processors 1302 to perform some or a totality of the wake source communication and data integrity checking, discussed herein.

The processors 1302 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute functional elements corresponding to the machine executable code 1306 (e.g., software code, firmware code, hardware descriptions) related to embodiments of the present disclosure. It is noted that a general-purpose processor (may also be referred to herein as a host processor or simply a host) may be a microprocessor, but in the alternative, the processors 1302 may include any conventional processor, controller, microcontroller, or state machine. The processors 1302 may also be implemented as a combination of computing devices, such as a combination of a DSP and a microprocessor, a plurality of microprocessors, one or more microprocessors in conjunction with a DSP core, or any other such configuration.

In some embodiments the storage 1304 includes volatile data storage (e.g., random-access memory (RAM)), non-volatile data storage (e.g., Flash memory, a hard disc drive, a solid state drive, erasable programmable read-only memory (EPROM), etc.). In some embodiments the processors 1302 and the storage 1304 may be implemented into a single device (e.g., a semiconductor device product, a system-on-chip (SOC), or a system-basis-chip, without limitation). In some embodiments the processors 1302 and the storage 1304 may be implemented into separate devices.

In some embodiments the machine executable code 1306 may include computer-readable instructions (e.g., software code, firmware code). By way of non-limiting example, the computer-readable instructions may be stored by the storage 1304, accessed directly by the processors 1302, and executed by the processors 1302 using at least the logic circuitry 1308. Also by way of non-limiting example, the computer-readable instructions may be stored on the storage 1304, transferred to a memory device (not shown) for execution, and executed by the processors 1302 using at least the logic circuitry 1308. Accordingly, in some embodiments the logic circuitry 1308 includes electrically configurable logic circuitry 1308.

In some embodiments the machine executable code 1306 may describe hardware (e.g., circuitry) to be implemented in the logic circuitry 1308 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, Verilog™, System-Verilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 1308 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments the machine executable code 1306 may include an HDL, an RTL, a GL description, a mask level description, other hardware description, or any combination thereof.

In embodiments where the machine executable code 1306 includes a hardware description (at any level of abstraction), a system (not shown, but including the storage 1304) may be configured to implement the hardware description described by the machine executable code 1306. By way of non-limiting example, the processors 1302 may include a programmable logic device (e.g., an FPGA or a PLC) and the logic circuitry 1308 may be electrically controlled to implement circuitry corresponding to the hardware description into the logic circuitry 1308. Also by way of non-limiting example, the logic circuitry 1308 may include hard-wired logic manufactured by a manufacturing system (not shown, but including the storage 1304) according to the hardware description of the machine executable code 1306.

Regardless of whether the machine executable code 1306 includes computer-readable instructions or a hardware description, the logic circuitry 1308 is adapted to perform the functional elements described by the machine executable code 1306 when implementing the functional elements of the machine executable code 1306. It is noted that although a hardware description may not directly describe functional elements, a hardware description indirectly describes functional elements that the hardware elements described by the hardware description are capable of performing.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc.," or "one or more of A, B, and C, etc.," is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." As used herein, "each" means some or a totality. As used herein, "each and every" means a totality.

Any characterization in this description of something as "typical," "conventional," "known," or the like does not necessarily mean that it is disclosed in the prior art or that the discussed aspects are appreciated in the prior art. Nor does it necessarily mean that, in the relevant field, it is widely known, well-understood, or routinely used. Such characterizations should be understood to mean "known to the inventor(s) of this disclosure."

Additional non-limiting embodiments of the disclosure include:

Embodiment 1: A physical layer transceiver of a 10SPE physical layer module, the physical layer transceiver comprising: a digital interface configured to define a side of a communication link between the physical layer transceiver and a physical layer controller of a split arrangement physical layer module; and a wake detect logic configured to communicate a source of a detected wake via the digital interface.

Embodiment 2: The physical layer transceiver according to Embodiment 1, wherein the source of the detected wake comprises a local wake or a remote wake.

Embodiment 3: The physical layer transceiver according to any of Embodiments 1 and 2, wherein the wake detect logic is configured to communicate the source of the detected wake by performing a wake source signaling handshake via the digital interface.

Embodiment 4: The physical layer transceiver according to any of Embodiments 1 through 3, wherein the wake detect logic is configured to communicate the source of the detected wake by providing a bus signal via the digital interface.

Embodiment 5: The physical layer transceiver according to any of Embodiments 1 through 4, wherein the wake detect logic is configured to generate and store one or more of a remote wake indication and a local wake indication that are accessible via the digital interface.

Embodiment 6: The physical layer transceiver according to any of Embodiments 1 through 5, further comprising a wake pin, wherein the wake detect logic is configured to generate a local wake indication responsive to an assertion of the wake pin.

Embodiment 7: The physical layer transceiver according to any of Embodiments 1 through 6, further comprising a power management pin configured to operatively couple to an enable pin of a switched voltage regulator.

Embodiment 8: The physical layer transceiver according to any of Embodiments 1 through 7, wherein the wake detect logic is configured to wake the physical layer transceiver to a boot state responsive to the detected wake.

Embodiment 9: The physical layer transceiver according to any of Embodiments 1 through 8, further comprising: a regulated supply output pin configured to operatively couple to a power supply pin of the physical layer controller of the 10SPE PHY module.

Embodiment 10: A physical layer controller of a 10SPE physical layer (PHY) module, the physical layer controller comprising: a digital interface configured to define a side of a communication link between the physical layer controller and a physical layer transceiver of a split arrangement physical layer device; and a physical layer wake forwarding logic configured to: learn a source of a detected wake via the digital interface; and generate a wake forward responsive to the source of the detected wake.

Embodiment 11: The physical layer controller according to Embodiment 10, wherein the wake forward comprises one or more of a remote wake forward or a local wake forward.

Embodiment 12: The physical layer controller according to any of Embodiments 10 and 11, wherein the physical layer wake forwarding logic is configured to handle additional detected wakes, sources of which are learned responsive to additional wake source signaling handshakes.

Embodiment 13: The physical layer controller according to any of Embodiments 10 through 12, comprising a wake detect logic configured to interpret a bus signal received via the digital interface.

Embodiment 14: The physical layer controller according to any of Embodiments 10 through 13, comprising a wake detect logic configured to read a wake indication stored at a PHY transceiver via the digital interface.

Embodiment 15: A method, comprising: observing a wake signal; communicating a source of a detected wake via a digital interface coupling a first physical layer portion and a second physical layer portion of a 10SPE physical layer module having a split arrangement physical layer; and performing a wake forwarding responsive to the source of the detected wake.

Embodiment 16: The method according to Embodiment 15, wherein communicating the source of the detected wake comprises performing a wake detect signaling handshake.

Embodiment 17: The method according to any of Embodiments 15 and 16, wherein communicating the source of the detected wake comprises interpreting a bus signal.

Embodiment 18: The method according to any of Embodiments 15 through 17, wherein communicating the source of the detected wake comprises reading a wake indication stored at the first physical layer portion of the 10SPE physical layer module.

Embodiment 19: The method according to any of Embodiments 15 through 18, further comprising handling additional wakes.

Embodiment 20: The method according to any of Embodiments 15 through 19, wherein handling additional wakes comprises communicating a source of a second wake.

Embodiment 21: The method according to any of Embodiments 15 through 20, further comprising: performing the wake forwarding responsive to the source of the second wake.

Embodiment 22: A package having pins configured for operative coupling to a circuitry of a physical layer transceiver of a 10SPE physical layer module having a split arrangement, the packaging comprising: a first number of the pins associated with a hardware interface of a physical layer transceiver and a physical layer controller that, when operatively coupled, form a split arrangement physical layer; a second number of the pins associated with a shared transmission medium; a third number of the pins associated with a power supply, the third number of the pins comprising a pin associated with an uninterruptible power supply; a fourth number of pins associated with a local wake; and a conductive mass arranged separately from the pins, the conductive mass associated with a ground path for the circuitry of the physical layer transceiver, and wherein the package has no more than eight pins.

Embodiment 23: The package according to Embodiment 22, further comprising: a fifth number of the pins associated with an enablement input of a power supply.

Embodiment 24: The package according to any of Embodiments 22 and 23, further comprising: a fifth number of the pins associated with a power supply pin of a physical layer controller of the 10SPE physical layer module, and configured for operative coupling to an on chip regulator supply of the physical layer transceiver.

Embodiment 25: The package according to any of Embodiments 22 through 24, comprising: a fifth number of the pins associated with an interruptible power supply.

Additional non-limiting embodiments of the disclosure relate to checking the integrity of digital logic circuitry of a digital interface of a physical layer controller of a 10SPE physical layer module having a split arrangement, and include:

Embodiment 1: A digital interface of a physical layer controller for a 10SPE physical layer module having a split arrangement, the digital interface comprising: a down-frequency encoder operatively coupled to a transmission path of the digital interface; and a loopback circuit arranged to convey an output of the down-frequency encoder toward a reception path of the digital interface.

Embodiment 2: The digital interface according to Embodiment 1, wherein the loopback circuit is enabled at least partially responsive to a selection signal asserted by a digital circuitry integrity checker that is provided outside the digital interface.

Embodiment 3: The digital interface according to any of Embodiments 1 and 2, comprising a sampling decoder arranged to receive the output of the down-frequency encoder conveyed toward the reception path of the digital interface by the loopback circuit.

Embodiment 4: The digital interface according to any of Embodiments 1 through 3, wherein the sampling decoder is configured to perform up-frequency decoding.

Embodiment 5: The digital interface according to any of Embodiments 1 through 4, wherein the down-frequency decoder is arranged to receive a data integrity frame conveyed toward the transmission path and provide a down-frequency encoded data integrity frame towards the loopback circuit, and wherein the sampling decoder is arranged to provide an up-frequency decode the down-frequency encoded data integrity frame to obtain a recovered data and provide the recovered data to a digital circuitry integrity checker.

Embodiment 6: A physical layer controller of a 10SPE physical layer module having a split arrangement, comprising: a digital interface configured to selectively convey a data frame from a transmission path of the digital interface to a reception path of the digital interface; and a digital circuitry integrity checker configured to: provide an integrity data to the transmission path; and compare the integrity data to recovered data from the reception path.

Embodiment 7: The physical layer controller according to Embodiment 6, wherein the digital circuitry integrity checker is configured to assert a selection signal, and the digital interface is configured to enable a path from the transmission path to the reception path at least partially responsive to assertion of the selection signal.

Embodiment 8: The physical layer controller according to any of Embodiments 6 and 7, wherein the digital interface comprising: a down-frequency encoder configured to apply down-frequency encoding to the data frame to obtain a down-frequency encoded data frame; and a sampling decoder configured to apply up-frequency decoding to the down-frequency encoded data frame to obtain the recovered data.

Embodiment 9: A method, comprising: applying down-frequency encoding to a first frame carried on a transmission path of a digital interface of a physical layer controller to obtain a down-frequency encoded first frame, wherein the physical layer controller is for a 10SPE physical layer module having a split arrangement; providing the down-frequency encoded first frame towards a reception path of the digital interface; applying up-frequency decoding to the down-frequency encoded first frame to obtain a recovered data; comparing the recovered data to an original integrity data corresponding to an integrity data included with the first frame; and determining an integrity result at least partially responsive to the comparing.

Embodiment 10: The method according to Embodiment 9, wherein the determining the integrity result comprises: determining an integrity of a digital logic circuitry of the physical layer controller.

Embodiment 11: The method according to any of Embodiments 9 and 10, further comprising providing a signal path within the digital interface, the signal path for providing the down-frequency encoded first frame to the reception path of the digital interface.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventors.

What is claimed is:

1. An apparatus, comprising:
a digital interface to define a physical layer transceiver side of a connection between a physical layer transceiver and a physical layer controller, respectively of a 10SPE physical layer;
a wake detect logic to communicate a source of detected wake from the physical layer transceiver to the physical layer controller via the digital interface; and
a power management connection to operatively couple to an enable connection of a switched voltage regulator.

2. The apparatus of claim 1, wherein the communicated source of detected wake comprises a local wake or a remote wake.

3. The apparatus of claim 1, wherein the wake detect logic to communicate the source of detected wake by performing a wake source signaling handshake via the digital interface.

4. The apparatus of claim 1, wherein the wake detect logic to communicate the source of the detected wake by providing a bus signal via the digital interface.

5. The apparatus of claim 1, wherein the wake detect logic to generate and store one or more of a remote wake indication and a local wake indication, the stored remote wake indication or stored local wake indication accessible via the digital interface.

6. The apparatus of claim 1, comprising a wake pin, wherein the wake detect logic to generate a local wake indication responsive to an assertion of the wake pin.

7. The apparatus of claim 1, wherein the wake detect logic to wake the physical layer transceiver to a boot state responsive to the detected wake.

8. An apparatus, comprising:
a digital interface to define a physical layer transceiver side of a connection between a physical layer transceiver and a physical layer controller, respectively of a 10SPE physical layer;
a wake detect logic to communicate a source of detected wake from the physical layer transceiver to the physical layer controller via the digital interface; and a regulated supply output connection to selectively provide power from the physical layer transceiver to a power supply connection of the physical layer controller.

9. The apparatus of claim 8, comprising a logic circuit of the physical layer transceiver, the logic circuit to alternately enable or disable supply of power via the regulated supply output connection responsive to the source of detected wake.

10. An apparatus, comprising:
a digital interface to define a physical layer controller side of a connection between the physical layer controller and a physical layer transceiver, respectively of a 10SPE physical layer device; and
a logic circuit to:
learn a source of detected wake via the digital interface; and
generate a wake forward responsive to the source of the detected wake.

11. The apparatus of claim 10, wherein the wake forward comprises one or more of a remote wake forward or a local wake forward.

12. The apparatus of claim 11, wherein the logic circuit to learn the source of detected wake responsive to a work source signaling handshake via the digital interface.

13. The apparatus of claim 12, wherein the logic circuit to handle additional detected wakes, sources of which are learned responsive to additional wake source signaling handshakes via the digital interface.

14. The apparatus of claim 10, wherein the logic circuit to interpret a bus signal received via the digital interface.

15. The apparatus of claim 10, wherein the logic circuit to read a wake indication stored at a physical layer transceiver via the digital interface.

16. A method, comprising:
observing a wake signal;
communicating a source of detected wake via a digital interface coupling a first physical layer portion and a second physical layer portion of a 10SPE physical layer; and
performing a wake forwarding responsive to the source of detected wake.

17. The method of claim 16, wherein communicating the source of detected wake comprises performing a wake detect signaling handshake.

18. The method of claim 16, wherein communicating the source of detected wake comprises interpreting a bus signal.

19. The method of claim 16, wherein communicating the source of detected wake comprises reading a wake indication stored at the first physical layer portion of the 10SPE physical layer.

20. The method of claim 16, comprising handling additional wakes.

21. The method of claim 20, wherein handling additional wakes comprises communicating sources of further detected wakes.

22. The method of claim 16, comprising:
performing a further wake forwarding responsive to a further source of detected wake.

23. An apparatus, comprising:
connections for operative coupling to a circuitry of a physical layer transceiver of a 10SPE physical layer,
wherein a first number of the connections are associated with a hardware interface of a physical layer transceiver and a physical layer controller, respectively of the 10SPE physical layer, and
wherein a second number of the connections are associated with a shared transmission medium, and
wherein a third number of the connections are associated with a power supply, wherein the third number of the connections include a connection associated with an uninterruptible power supply, and
wherein a fourth number of the connections are associated with a local wake, and
wherein the total number of connections is no more than eight; and
a conductive mass arranged separately from the connections, the conductive mass associated with a ground path for the circuitry of the physical layer transceiver.

24. The apparatus of claim 23, wherein a fifth number of the connections are associated with an enablement input of a power supply.

25. The apparatus of claim 23, wherein a fifth number of the connections are associated with a power supply pin of a physical layer controller of the 10SPE physical layer module, and for operative coupling to an on-chip regulator supply of the physical layer transceiver.

26. The apparatus of claim 23, wherein a fifth number of the connections are associated with an interruptible power supply.

* * * * *